(12) United States Patent
Futterer

(10) Patent No.: US 10,698,149 B2
(45) Date of Patent: Jun. 30, 2020

(54) DISPLAY FOR TWO-DIMENSIONAL AND/OR THREE-DIMENSIONAL IMAGES

(71) Applicant: SEEREAL TECHNOLOGIES S.A., Munsbach (LU)

(72) Inventor: Gerald Futterer, Metten Bayern (DE)

(73) Assignee: SERREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 16/085,365

(22) PCT Filed: Mar. 16, 2017

(86) PCT No.: PCT/EP2017/056205
§ 371 (c)(1),
(2) Date: Sep. 14, 2018

(87) PCT Pub. No.: WO2017/158073
PCT Pub. Date: Sep. 21, 2017

(65) Prior Publication Data
US 2019/0086598 A1  Mar. 21, 2019

(30) Foreign Application Priority Data
Mar. 16, 2016 (EP) .................................... 16160660

(51) Int. Cl.
*G02B 5/32* (2006.01)
*G02B 6/00* (2006.01)
(Continued)

(52) U.S. Cl.
CPC .............. *G02B 5/32* (2013.01); *G02B 6/0031* (2013.01); *G02B 6/0035* (2013.01);
(Continued)

(58) Field of Classification Search
CPC combination set(s) only.
See application file for complete search history.

(56) References Cited

U.S. PATENT DOCUMENTS 7,342,717 B1* 3/2008 Hausmann ........... C12Q 1/6869
                                                           359/368
2002/0048075 A1* 4/2002 Kumkar .................... G02F 1/11
                                                           359/285
(Continued)

FOREIGN PATENT DOCUMENTS

WO      2003081320 A1    10/2003
WO      2012062681 A1    5/2012

OTHER PUBLICATIONS

International Search Report, dated Aug. 10, 2017, and Written Opinion issued in international Application No. PCT/EP2017/056205.

*Primary Examiner* — Wesner Sajous
(74) *Attorney, Agent, or Firm* — Saul Ewing Arnstein & Lehr LLP

(57) ABSTRACT

The invention refers to an apparatus for generating two-dimensional and/or three-dimensional objects. The apparatus comprises at least one spatial light modulator device for modulating incident light and an optical system. The optical system is designed and arranged such that a segmentation of wave fields is provided in a plane, where the plane in which the segmentation of the wave fields is provided differs with a plane that comprises object points. Adjacent segmented wave fields do have a mutual overlap. The apparatus also comprises a scanning device which couples light waves into a beam expanding waveguide with outcoupling gratings.

31 Claims, 19 Drawing Sheets

(51) Int. Cl.
*G02B 27/01* (2006.01)
*G02F 1/13* (2006.01)
*G09G 3/20* (2006.01)
*F21V 8/00* (2006.01)
*G02B 27/48* (2006.01)
*G02F 1/13357* (2006.01)
*G06F 3/01* (2006.01)

(52) U.S. Cl.
CPC ......... *G02B 6/0063* (2013.01); *G02B 6/0068* (2013.01); *G02B 27/0101* (2013.01); *G02B 27/0103* (2013.01); *G02B 27/0172* (2013.01); *G02B 27/48* (2013.01); *G02F 1/133615* (2013.01); *G02F 1/133621* (2013.01); *G06F 3/013* (2013.01); *G02B 2027/0107* (2013.01); *G02B 2027/0125* (2013.01); *G02B 2027/0174* (2013.01)

(56) References Cited

U.S. PATENT DOCUMENTS

| | | | |
|---|---|---|---|
| 2010/0259804 A1* | 10/2010 | Buschbeck | G02B 6/001 359/34 |
| 2014/0126029 A1* | 5/2014 | Fuetterer | G02B 5/1857 359/3 |
| 2015/0268399 A1* | 9/2015 | Futterer | G02B 6/005 315/151 |
| 2015/0277551 A1 | 10/2015 | Travis | |
| 2016/0327906 A1* | 11/2016 | Futterer | G02F 1/133553 |

* cited by examiner

DISPLAY FOR TWO-DIMENSIONAL AND/OR THREE-DIMENSIONAL IMAGES

CROSS REFERENCE TO RELATED APPLICATIONS

This application claims the priority of PCT/EP2017/056205, filed on Mar. 16, 2017, which claims priority to European Application No. 16160660.3, filed on Mar. 16, 2016, the entire contents of each of which are incorporated fully herein by reference.

BACKGROUND OF THE INVENTION

The present invention relates to an apparatus for generating two-dimensional and/or three-dimensional objects. In particular, the present invention relates to holographic two-dimensional (2D) and/or three-dimensional (3D) displays as well as to display and imaging applications which use segmented illumination and/or segmented imaging. In particular, the present invention refers to combining of a plurality of light sources.

Holographic display devices require a light source or an illumination device that emits sufficiently coherent light. The illumination device or light source should achieve a high power at stabilized wavelength. Such illumination devices or light sources are at a very high price.

Therefore, devices able to combine several light sources, for example lasers, and to enable high definition (HD) holographic display products are of special interest. Important criteria or roles are the price and the total optical power of the light sources, which might exceed a value of 1 W per primary color, for example, for a 40 inch holographic display device if an outdoor application or a head-up display (HUD) within a mobile vehicle might be the intended application. In addition, a segmented illumination and/or a segmented imaging would allow effective local dimming which enables a high dynamic range (HDR) of images generated in a three-dimensional object space. And, it also allows an effective power management by increasing the total power efficiency of an imaging apparatus, that is, of a display device as, for example, a holographic television (TV).

Local dimming enables a high dynamic range and a high image contrast. A segmented illumination or a scanning illumination may be able to provide a homogeneous illumination of a spatial light modulator device (SLM), which is used for an image generation, or for a local dimming-type of illumination. Such a local dimming-type of illumination is an intensity distribution that can have, for example, intensity values ranging from 0 (zero) to 1 (one), where it is referred to a maximum intensity value obtained locally. For example, in a two-dimensional (2D) display device the spatial light modulator device, which has to be illuminated, is equivalent to the plane of the image points generated. In holographic display devices, these two planes are not the same. Holographic display devices require a different approach, especially, in order to provide high definition (HD) imaging in combination with segmented illumination.

In other words, local dimming based on scanning of a single light beam, which has e.g. a diameter of 1 mm, might be used for a high definition two-dimensional display device. But using this approach in order to illuminate the spatial light modulator device generating a three-dimensional (3D) holographic scene will result in a low resolution of the image obtained. Holographic display devices require tailored illumination.

A segmented decoupling of light out of a light guide is disclosed in WO 2003/081320 A1. These decoupled wave field segments representing a two-dimensional object plane are redirected to the eyes of an observer. This document discloses a plurality of embodiments using segmented illumination or segmented decoupling of light. The segmented illumination is provided in the plane of a spatial light modulator which is the plane the observer is looking at. In this specific case high definition viewing experience can only be achieved partially. In detail, the document to WO 2003/081320 A1 discloses an optical device including a light-transmitting substrate having at least two major surfaces and edges. The optical device comprises further optical means for coupling light into the substrate by total internal reflection and at least one partially reflecting surface located in the substrate, where this surface is non-parallel to the major surfaces of the substrate. The light beams coupled into the substrate have the same off-axis angle inside the substrate and intersect the partially reflecting surface with two different incident angles. However, a high definition (HD) resolution cannot be provided and achieved using such a device.

SUMMARY OF THE INVENTION

Therefore, it is an object of the present invention to provide an apparatus which enables a high definition (HD) viewing experience for an observer who observes a three-dimensional holographically reconstructed object or scene.

Furthermore, it is a further object of the present invention to provide segmented illumination and/or segmented imaging in the apparatus, in particular in a display device for the reconstruction and display of three-dimensional objects or scenes.

For this reason, according to the present invention the object is achieved by way of an apparatus according to claim 1.

The object according to the invention is achieved by an apparatus for imaging or generating two-dimensional and/or three-dimensional objects or scenes. The apparatus comprises at least one spatial light modulator device and an optical system. The at least one spatial light modulator device is provided for modulating incident light emitted by an illumination device. The optical system is designed and arranged such that a segmentation of wave fields is provided in a plane, where the plane in which the segmentation of the wave fields is provided is not consistent with or differs with a plane in which object points exist or that comprises object points. In that plane adjacent segmented wave fields do have a mutual overlap.

The present invention discloses a general solution for a segmented illumination and/or a segmented imaging which enables a high definition (HD) viewing experience for an observer using the apparatus. The apparatus can be designed, for example, as a holographic display device. The holographic display device, in turn, can be designed, for example, as a holographic television, a holographic desktop monitor or a holographic mobile display device as e.g. a laptop-shaped mobile computer providing holographic three-dimensional (3D) scene reconstruction. An important feature of the present invention is the use of overlap regions or overlap zones present between adjacent wave field segments.

In order to provide high definition viewing experience for an observer during the use of the apparatus of the present invention complex-valued distributions of the wave field segments to be combined, that is complex-valued distributions of wave fields illuminating the spatial light modulator device and/or complex-valued distributions of wave fields modulated by the spatial light modulator device, can be optimized. The teaching of the present invention can be used advantageously for embodiments combining a plurality of individual light sources, for example, lasers or laser diodes, for embodiments using local dimming. These embodiments using local dimming can be combined with high dynamic range (HDR) imaging. Furthermore, the teaching of the present invention can be used advantageously for imaging devices spanning a large field of view (FOV) by using spatio-temporal segmentation of wave fields generating virtually or even real object points in a three-dimensional (3D) space. For example, the object points generated in front of a holographic direct view display device are real object points. Imaginary image points are generated behind the display device, seen from an observer to the display device. A head-mounted display device (HMD) might generate imaginary object points only. However, the invention described herein is applicable to them in an advantageous way, too. The optimization of the overlap region or zone present between two adjacent wave field segments is mainly focused on a minimum size of the overlap region required and on the optimization of the intensity profiles of the wave field segments to be combined within the illumination beam path and/or within the imaging beam path or, in other words, within an illumination device and/or an imaging device. Advantageously, high definition (HD) viewing experience can be provided even in the case of using spatio-temporal combination of segmented wave fields.

Segmentation of light is already used in illumination applications and in imaging applications. A plurality of devices, for example, as backlight units (BLU) in an illumination device provide homogeneous illumination by using a plurality of primary light sources, which are combined in order to provide the luminance required. The generation of three-dimensional objects in space at high definition image resolution by using well-known state of the art devices using segmented illumination and/or segmented imaging, however, is not possible until now. Also, this applies to holographic display devices, to head-up display devices (HUD), head-mounted display devices (HMD) and other projection-type display devices. In other words, this applies to all optical devices or optical display devices that use segmentation of light, for example in the illumination beam path or in the imaging beam path, in planes or curved areas that are not the planes in which the object points are generated and an observer is looking at to observe the reconstructed object points or scenes.

In contrast to the application discussed herein and using the apparatus according to the present invention, a very small depth range can be imaged at high definition resolution by using stereoscopic imaging techniques even in the case of using segmented illumination with a very small overlap. The overlap might be, for example, in a sub-millimetre range. This also applies to integral imaging or light field display devices. For example, a state of the art segmentation, which is used in the imaging unit of a head-mounted display device (HMD), cannot provide high definition viewing experience.

If object points of an object or of a scene are generated at a significant distance to the spatial light modulator device (SLM), which may be, for example, ≥5% of the distance from the spatial light modulator device to the observer, segmented illumination or segmented imaging, which does not use defined overlap regions or zones, will significantly decrease the image resolution detected by the observer. This is relevant particularly for holographic display devices, for projection-type display devices as e.g. head-mounted display devices (HMD), for integral imaging display devices or for light field display devices.

Within illumination applications and/or imaging applications the segmentation can be implemented by using overlap regions or zones, which may have a minimum size or dimension depending on the discrete embodiment. The principle of using an overlap in the case of combining wave field segments enables a high definition resolution (HD). Thus, this principle can be applied to a plurality of illumination approaches and/or imaging approaches. The overlap criterion applies to the entire physical process of imaging, which included the illumination of a spatial light modulator device and the imaging beam path following this spatial light modulator device on the way to eyes of an observer. This also applies accordingly if a camera detector plane is used instead of the eye of an observer focussing onto an object plane. Thus, the use of the overlap criterion and the related optimization of intensity profiles are particularly advantageous in the case of illuminating a spatial light modulator device or in the case of generating a wide field of view (FOV) and presenting this to an observer, for example by using a holographic head-mounted display (HMD), while using segmented wave fields. This applies to three-dimensional object points generated in space as well as to a two-dimensional (2D) image plane generated by using wave field segments.

The procedure to utilize segmentation of wave fields in illumination beam path and/or imaging beam path of optical devices by implementing overlapping regions or zones present between the individual segments is advantageous in order to gain high definition viewing experience.

The segmentation using overlap is the basis of an effective combination of a plurality of primary light sources, as e.g. laser diodes or lasers, in order to provide a total wave field having a very high luminance, as e.g. a luminance of greater 1000 cd/m$^2$, and local dimming leading to a high dynamic range imaging (HDRI). In other words, the segmentation of wave fields in illumination beam paths and/or in imaging beam paths can be related to an approach of effective combining a plurality of light sources.

A point spread function (PSF) can be used to describe the transfer of an object point in space onto the retina of an eye of an observer. A segmentation can be used which provides a temporal overlap region or zone and/or spatial overlap region or zone and which leads to a linear intensity distribution within the entrance pupil of the human eye having a minimum value of 0 (zero) at one side of the entrance pupil and a maximum value of 1 (one) at the other side of the entrance pupil. The intensity distribution present in the entrance pupil of the human eye is thus a linear ramp function. A practical assumption is that the phase distribution $\varphi(x,y)$ representing the object point to be imaged onto the retina is constant within the entrance pupil of the human eye. Without loss of generality, the potential object point to be imaged by using an overlap based segmented illumination or an overlap based segmented imaging might be placed at infinite distance. Other distances can also be used without loss of generality.

The use of an overlap and an intensity distribution that is a linear ramp function results in a Strehl ratio, for example, of SR=0.96. Thus, an image resolution can be provided that generates high definition viewing experience or is at least very close to high definition viewing experience. Here, the intensity ramp present within the entrance pupil of the human eye, which has for example a diameter of $\varnothing_{EP}$=3 mm, goes from a value of 0 (zero) to a value of 1 (one). For example, for an entrance pupil diameter a mean value of approximately 3.5 mm can be assumed for a luminance of 30 cd/m$^2$, a mean value of approx. 2.9 mm can be assumed for a luminance of 100 cd/m$^2$, a mean value of slightly more than 2 mm can be assumed for a luminance of 300 cd/m$^2$ and a mean value of approx. 1.9 mm can be assumed for a luminance of 1000 cd/m$^2$. Depending on the discrete application values of the entrance pupil diameter of approx. 2 mm to 3.5 mm might be used in order to design the apparatus according to the present invention intended to provide three-dimensional viewing experience within the object space. In general, dimensions of the overlap regions or zones larger than the entrance pupil diameter would result in increased values of the Strehl ratio, that is, e.g. SR>0.98 or even SR>0.99. The discrete complex-valued distribution of the illumination segments and/or imaging segments, that is, especially the complex-valued distribution present within the overlap region or zone, depends on the discrete application, which might be e.g. a holographic direct view display device, a holographic laptop-shaped mobile computer, a holographic head-mounted display device, a head-up display device or a projection-type display device using segmented illumination and/or segmented imaging. These are only examples. There are much more fields of application.

Hence, segmented illumination or segmented imaging or wave field segmentation will not lead to a high definition viewing experience if the segmentation is carried out in planes or in curved surfaces that are not the planes where the object points are generated the observer is focussing at. In the case of a holographic display device real object points can be generated in front of the display device and imaginary object points can be generated behind the display device, seen in the direction an observer is looking at the plane of the display panel. Thus, segmentation of the illumination of the spatial light modulator device by adapting state of the art approaches cannot lead to a high definition viewing experience.

Further preferred embodiments and improvements of the present invention are defined in the dependent claims.

In a first preferred embodiment of the invention, the apparatus can be designed such that at least one light guiding element is provided, the at least one light guiding element comprising the optical system which is arranged within the at least one light guiding element in such a way that a defined decoupling of wave fields is provided. Such an apparatus can be designed as a head-mounted display device comprising in addition to a spatial light modulator device at least one light guiding element for a segmented light or wave field decoupling. In other words, for a head-mounted display device light guiding elements or waveguides are utilized mostly. Thus, according to the invention, the optical system can be provided within the light guiding element or waveguide in order to generate a segmentation of wave fields using an overlap between adjacent segmented wave fields. In this way, high definition viewing experience can be gained for a head-mounted display device or helmet-mounted display device or any other near-to-eye applications.

In a further preferred embodiment of the present invention it can be provided that the at least one spatial light modulator device is a self-illuminating (light emitting) spatial light modulator device. The spatial light modulator device (herein also referred to as SLM) can be designed as an OLED-SLM (organic light emitting diode SLM). Thus, the apparatus according to the invention does not need any (additional) light sources as laser(s) or laser diodes for illuminating the spatial light modulator. An apparatus comprising such a self-emitting spatial light modulator device can be used advantageously for near-to-eye applications such as in head-mounted display devices. The segmentation of the light or wave field is carried out in the imaging beam path. In other words, the segmentation of angular segments of the—here projected—image scene takes place behind the spatial light modulator device, seen in the direction of propagation of light, in other words e.g. within the light guiding optics used.

If the spatial light modulator device of the apparatus according to the present invention is no self-emitting spatial light modulator device, the apparatus can comprise an illumination device having at least one light source. The illumination device is provided for illuminating the spatial light modulator device. In this illumination beam path segmentation of the light or wave field emitted by the at least one light source is provided. A single light source might be e.g. used in combination with local dimming and/or high dynamic range, which based on scanning and synchronized intensity modulation. Preferably, at least two individual light sources, more preferably a plurality of light sources, are provided in the illumination device for emitting wave fields in order to generate wave field segments. These individual light beams or wave fields or wave field segments are combined in the illumination beam path to a single combined light beam or wave field for illuminating the spatial light modulator device. Thus, low-cost light sources, for example low-cost lasers or low-cost laser diodes, can be used. It can be preferred that the at least two light sources are designed as laser diodes or light emitting diodes which are combined with each other. Using several laser diodes can reduce the costs, can increase the brightness and it can simplify the implementation of fast dynamic local dimming.

Advantageously, it can be provided that the segmentation of the wave fields is provided in the illumination beam path and/or imaging beam path by which wave field segments are generated, where adjacent wave field segments form overlapping regions or zones between the wave field segments.

According to the present invention it can be provided that individual light sources of the illumination device are provided to generate wave field segments. Advantageously, each individual light source of the illumination device can be provided to generate a corresponding wave field segment.

Preferably, it can be provided that the wave fields of the overlapping wave field segments are mutually incoherent to each other. The wave fields of adjacent segments do not cause coherent crosstalk. In this way, coherent crosstalk is reduced along the horizontal/vertical direction. The amount of crosstalk reduction or even cancellation depends on the discrete embodiment. For example, if the illumination segment size present within the complex-valued plane of the spatial light modulator device of a holographic display device is e.g. 3 mm only, sub-holograms, which have larger mutual distance, are mutually incoherent. Hence, for the optimization of the retinal image only a small local sub-hologram area of e.g. 3 mm has to be considered.

The wave fields may be complex-valued wave fields, where the intensity distribution of the complex-valued wave fields is adapted such that the total intensity distribution generated by the overlapping wave field segments is a homogeneous intensity distribution.

In a further preferred embodiment of the present invention it can be provided that the optical system comprises at least one grating, preferably a volume grating, or reflective layer for the segmentation of the wave fields.

The grating can be designed as a one-dimensional grating or as a grating being substantially rectangular shaped along two directions or substantially hexagonal along two directions.

Preferably, the individual wave field segments used to illuminate the at least one spatial light modulator device can be controlled individually in the amplitude present within a time frame.

It can still be provided that the overlap of the wave field segments is provided within an (entire) area of the spatial light modulator device to be illuminated or within the entire area to be imaged by the spatial light modulator device, at least within a defined time frame.

In a further embodiment of the present invention it can be provided that the overlap of the wave field segments provided to illuminate an entire area of the spatial light modulator device or to image an entire area of the spatial light modulator device at least within a defined time frame, which is equivalent to a part of an image frame $\Delta t$, is carried out in a temporal scanning procedure.

In a further preferred embodiment of the present invention it can be provided that at least two light sources, preferably designed as laser diodes, are combined with each other, where at least one Bragg resonator mirror element assigned to the at least two light sources provides a single spectral output wavelength for the at least two light sources, the spectral output wavelength does not exceed a limit of $\Delta\lambda_0 \leq 0.1$ nm as mutual difference value of the laser line emitted. For example, it is also possible to use other diffractive wavelength stabilizing arrangements or configuration, as e.g. the Littrow configuration.

Furthermore, it can be provided that at least two light sources, preferably designed e.g. as laser diodes, are combined with each other, where at least one Bragg resonator mirror element assigned to the at least two light sources provides a single spectral output wavelength for the at least two light sources, the spectral output wavelength does not exceed a limit of $\Delta\lambda \leq 0.1$ nm of the spectral line width of the light emitted.

In a further advantageous embodiment of the present invention it can be provided that a scanning unit is provided for carrying out spatio-temporal scanning of wave field segments.

It can still be preferred that a beam shaping element is provided for transforming incident wave fields provided by individually controlled light sources into defined complex-valued wave field segments.

The beam shaping element transforming incident wave fields can be designed as a rotating scatter plate or a rotating scatter foil or a dynamic beam shaping diffuser.

Advantageously, the apparatus according to the invention provides a high dynamic range imaging and/or a high luminance imaging.

It can be preferred if an intensity distribution generated has a maximum value in the center of a wave field segment and a value of zero at a rim of the wave field segment.

It can be further preferred if a phase distribution within a wave field segment is a constant phase distribution or a continuous phase distribution.

Advantageously, the light intensity distribution required for a partial illumination of the spatial light modulator device can be generated by active phase gratings or active polarization gratings.

Furthermore, it can be provided a spectral conversion within the apparatus according to the present invention. For this purpose, a spectral conversion layer can be provided at an entrance plane of the spatial light modulator device. For the material of the spectral conversion layer quantum dots can be used.

A combination of the spectral conversion layer and a structured color filter array for the primary light colors can be provided for carrying out the spectral conversion. It is also possible to use a triple notch filter for the primary light colors.

It can be further preferred if a spatial separation of different colors emitted by one single light source or a plurality of light sources is provided. For the generation of the spatial separation of different spectral components a grating and a micro lens array in combination are provided.

The object of the present invention is still achieved by a method for generating segmented wave fields (or for combining a plurality of wave fields), comprising:
  generating at least two wave fields in front or behind at least one spatial light modulator device, seen in the direction of propagation of light,
  segmenting the at least two wave field by an optical system, and
  generating an overlap of adjacent segmented wave fields.

By means of this method according to the invention a plurality of wave fields, e.g. generated by a plurality of light sources, can be combined. An object is generated by using overlapping wave field segments.

Advantageously, in case of using coherent light sources spectral conversion can be carried out for providing mutual incoherence of the wave field segments.

There are now various possibilities for advantageously configuring and refining the teaching of the present invention and/or combining the embodiments described above with one another—as far as it is possible. In this regard, reference is made on the one hand to the patent claims dependent on the independent patent claims, and on the other hand to the following explanation of the preferred exemplary embodiments of the invention with the aid of the drawing. In connection with the explanation of the preferred exemplary embodiments of the invention with the aid of the drawing, preferred configurations and refinements of the teaching are also explained in a general way.

Like reference designations denote like components in the individual figures and accompanying description, if provided. In the following sections, the designations "in front of" and "behind", e.g. in front of the spatial light modulator device, mean the light seen relating to the propagation direction of the light.

DETAILED DESCRIPTION OF THE INVENTION

Figure 1:
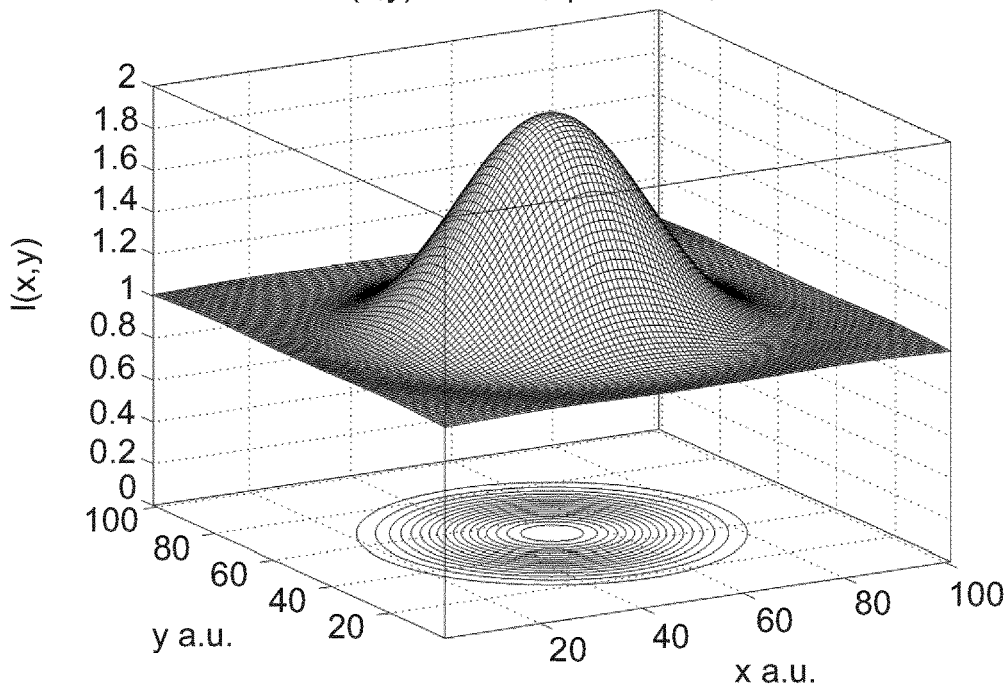
FIG. 1 shows an Airy distribution in a detector plane in a three-dimensional plot according to the present invention.

FIG. 1 shows a three-dimensional, graphical representation of an Airy distribution in a detector plane. This Airy distribution is a point spread function present on the retina of a human eye. The upper part of this graphical representation shows the point spread function used to describe the transfer of an object point in space onto the retina of an eye of an observer as a mesh grid-type three-dimensional plot. The lower part of this graphical representation shows the contour plot of this Airy distribution. Under ideal conditions, that is, if no aberrations exist, this is an Airy distribution. By definition the Strehl ratio (SR) of this point spread function has a value of 1 (one). This means that the point spread function is the best case that can be obtained. The intensity distribution in an entrance pupil of the human eye can be assumed as being constant. Furthermore, it is assumed that a phase distribution representing an object point to be imaged onto the retina is constant within the entrance pupil of the human eye. Here, for example, a possible object point to be imaged is placed at infinite distance. This assumption can be used without loss of generality.

Figure 2:
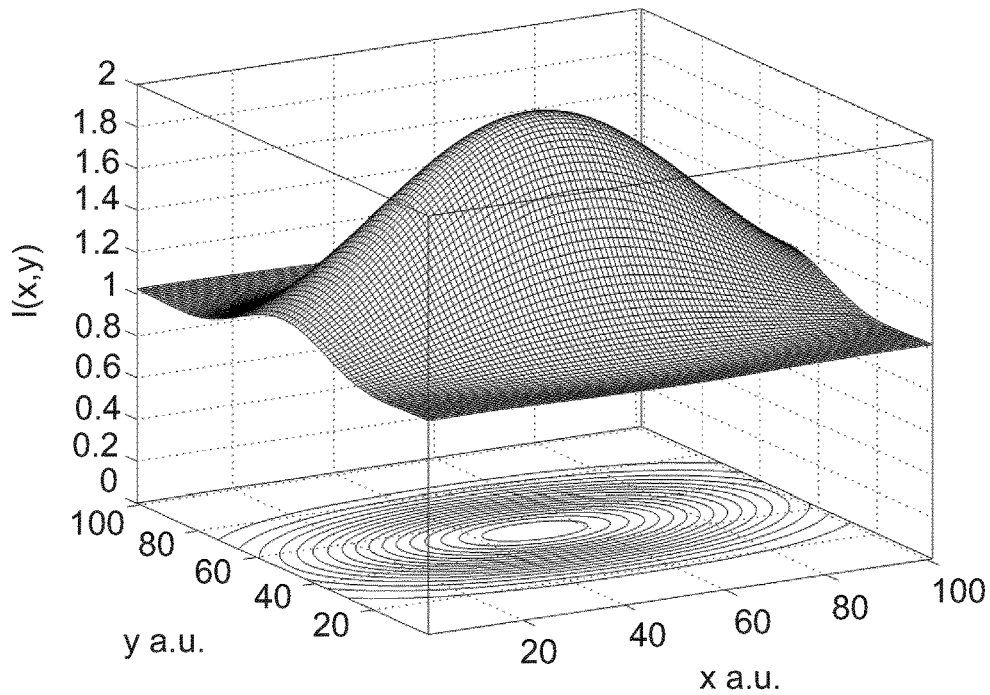
FIG. 2 shows a point spread function present on the retina of a human eye in case of only using one half of an entrance aperture of the human eye according to the present invention.

FIG. 2 shows in a graphical representation a point spread function present on the retina of a human eye in case of only using one half of the entrance aperture of the human eye. As in FIG. 1, the upper part of this representation shows the point spread function used to describe the transfer of an object point in space onto the retina of the eye of an observer as a mesh grid-type three-dimensional plot in the case of using a stepwise intensity distribution within the entrance pupil of the human eye. The lower part of this representation shows the contour plot of this distribution. The intensity distribution in the entrance pupil of the human eye is described by a step function which has a value of 0 (zero) for one half of the entrance pupil and a value of 1 (one) for the opposite half of the entrance pupil of the human eye. It can be assumed that the phase distribution representing an object point to be imaged onto the retina is constant within the entrance pupil of the human eye. A possible object point to be imaged by using a segmented illumination or a segmented imaging approach is placed at infinite distance. This assumption can be used without loss of generality.

More precisely, FIG. 2 represents the point spread function in the case of using segmented illumination and/or segmented imaging. The wave field tiles or segments used for illumination or imaging are combined in a side-to-side arrangement without overlaps and gaps. It is assumed that the mutual coherence of adjacent wave field tiles or segments is 0 (zero). Thus, the wave field tiles or segments are incoherent to each other. The intensity distribution present on the retina of an eye of an observer is, however, no longer an Airy distribution. The Strehl ratio (SR) of this point spread function has a value of 0.87 only. The main broadening of the point spread function is introduced perpendicular to the step function present within the intensity distribution I(x,y), which represents an object point to be imaged and which exists within the entrance pupil of the human eye. Although the value of SR=0.87 is sufficient for a plurality of optical systems, it is not sufficient in order to generate high definition (HD) images on the retina of the human eye. As can be seen in FIG. 2, a directional value of the Strehl ratio might be introduced for the x-direction and/or the y-direction in order to describe a non-symmetric broadening of the point spread function introduced by using wave field tiles or segments having no overlaps. Thus, along the y-direction a high definition viewing experience of greater than 75% might be obtained. And along the x-direction an approximately half high definition viewing experience might be generated only.

Figure 3:
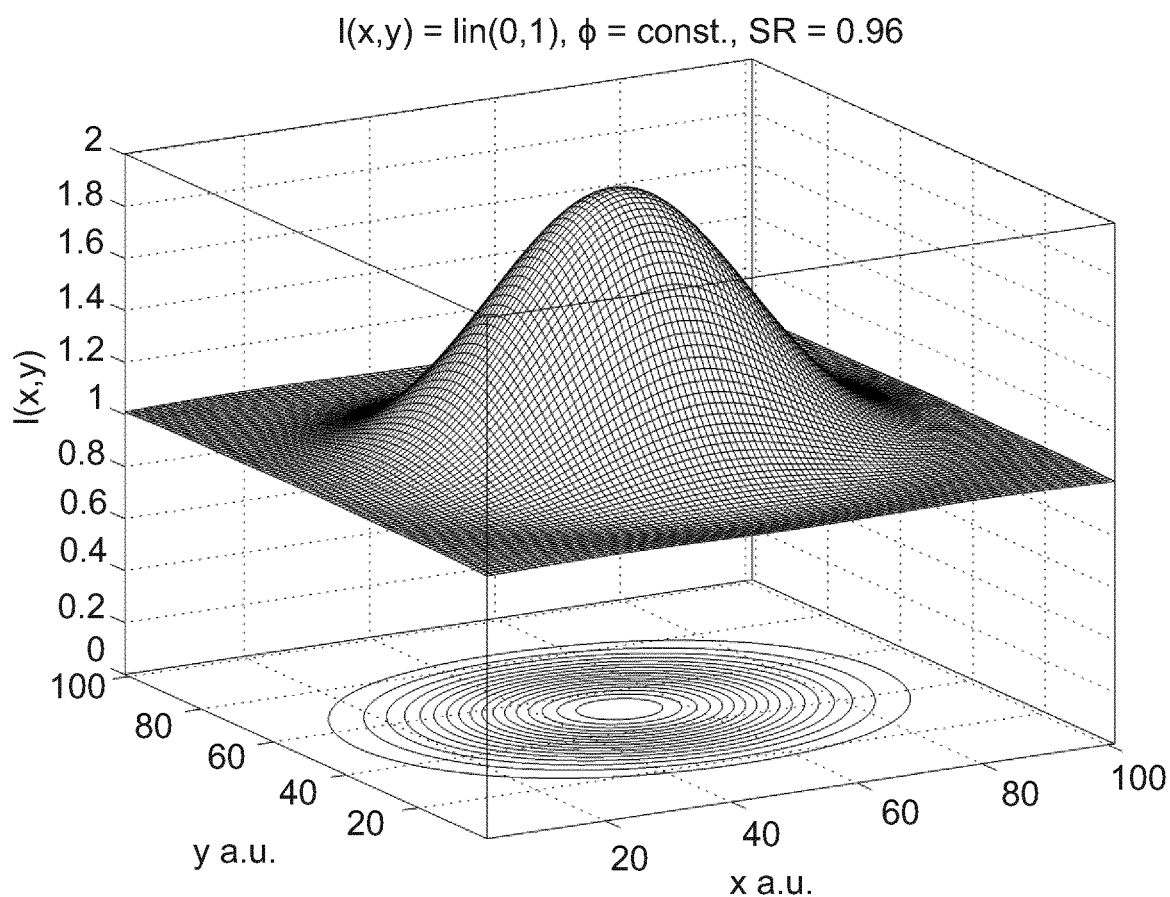
FIG. 3 shows a point spread function present on the retina of a human eye in case of using a constant phase present in an entrance aperture of the human eye.

FIG. 3 shows in a graphical representation a point spread function present on the retina of a human eye in the case of using a constant phase in an entrance aperture of the human eye, which is also called entrance pupil. The corresponding intensity distribution is a wedge-shaped intensity distribution. This wedge-shaped intensity distribution has an intensity value of 0 (zero) at one side of the entrance pupil and a maximum intensity value at the opposite side of the entrance pupil of the human eye.

More precisely, in FIG. 3 the upper part shows the point spread function used to describe the transfer of an object point in space onto the retina of an eye of an observer as a mesh grid-type three-dimensional plot in the case of using a linear intensity distribution within the entrance pupil of the human eye. This linear intensity distribution has a minimum value of 0 (zero) at one side of the entrance pupil and a maximum value of 1 (one) at the other side of the entrance pupil of the human eye. The lower part of FIG. 3 shows the contour plot of this distribution. The intensity distribution present in the entrance pupil of the human eye is a linear ramp function now. It can be assumed that the phase distribution $\varphi(x,y)$ representing an object point to be imaged onto the retina is constant within the entrance pupil of the human eye. The possible object point to be imaged by using an overlap based segmented illumination or an overlap based segmented imaging approach is placed at infinite distance. This assumption can be used without loss of generality.

The procedure of using an overlap and an intensity distribution which is a linear ramp function results in a Strehl ratio of SR=0.96. Therefore, an image resolution can be provided that results in high definition viewing experience or is at least very close to a high definition viewing experience. The intensity ramp present within the entrance pupil of the human eye having e.g. a diameter of $Ø_{EP}$=3 mm runs from a value of 0 (zero) to a value of 1 (one). For the entrance pupil diameter a mean value of approximately 3.5 mm can be assumed for a luminance of 30 $cd/m^2$, a mean value of approx. 2.9 mm can be assumed for a luminance of 100 $cd/m^2$, a mean value of slightly more than 2 mm can be assumed for a luminance of 300 $cd/m^2$ and a mean value of approx. 1.9 mm can be assumed for a luminance of 1000 $cd/m^2$. Depending on the discrete application values of the entrance pupil diameter of approx. 2 mm to 3.5 mm might be used in order to design the optical system or the apparatus according to the invention intended to provide three-dimensional (3D) viewing experience within the object space. In general, overlap regions or zones larger than the entrance pupil diameter would result in increased values of the Strehl ratio, that is, for example SR>0.98 or even SR>0.99.

Figure 4:
FIG. 4 shows a superposition of triangular-shaped intensity segments forming a homogeneous total intensity distribution.
Figure 11:
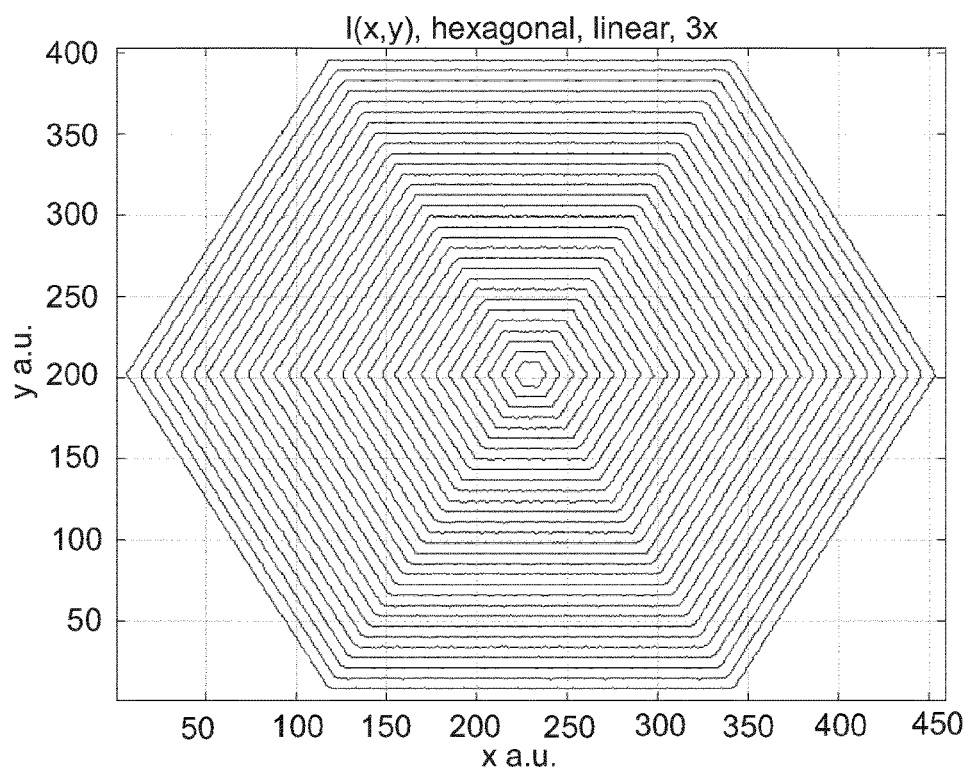
FIG. 11 shows an intensity distribution of a hexagonal-shaped wave field segment providing a homogeneous total intensity distribution.

FIG. 4 shows in a graphical representation a superposition of triangular-shaped intensity segments forming a homogeneous total intensity. This representation is only a cross section which might be related to a plurality of different two-dimensional intensity distributions. Therefore, FIG. 4 shows how a homogeneous intensity distribution can be generated by combining nested wave field segments with tailored intensity profiles placed at laterally shifted positions. The upper dot-and-dashed-line of FIG. 4 denotes the total intensity distribution which is constant over a defined area. The lower part of FIG. 4 shows the intensity distribution of mutually incoherent wave field segments. These incoherent wave field segments have a linear transition zone which is the overlap region or zone present between neighboured wave field segments. This superposition of wave field segments can be used in illumination devices or in imaging devices of an apparatus for the representation of three-dimensional objects or scenes using segmentation. Thus, this can be referred to backlight units (BLU) or front light units (FLU) using segmented illumination of a spatial light modulator device (in the following referred to as SLM), to head-up display devices (HUD) or to head-mounted display devices (HMD) using segmentation within the optical imaging path in order to span the entire field of view (FOV) presented to an observer. A condition of a practical implementation is to generate an overlap of all wave field segments providing a high defined viewing experience. For the purpose of the segmentation and the providing of a high definition viewing experience the arrangement shown in FIG. 4 can be used. The superposition of the plurality of wave field segments results in a required intensity profile. It might be intended to finally obtain an intensity distribution that can be described by a mean intensity value and local variations which do not exceed a value of ±10% of the average mean value. The intensity distribution obtained finally can be calibrated. And, the calibrated data can be used and stored in a look-up table (LUT). These stored data can be used, for example as correction data, for example for holographic encoded three-dimensional scenes or objects. The cross section shown in FIG. 4 applies to different footprints. Circular intensity profiles, for example cylindrical cone-like intensity profiles, might be used as well as rectangular intensity profiles, or for example square pyramidal wave field segments or hexagonal pyramidal wave field segments. In other words, there are different intensity distributions, two-dimensional (2D) or even on-dimensional (1D), which might have the triangle cross section, which is shown in FIG. 4. Thus, FIG. 4 represents several intensity distributions, which might be used for the superimposed wave field segments. For example, the intensity distribution of a wave field segment that is shown in FIG. 11 has also a triangular cross section. The cross section shown might also represent a one-dimensional segmentation. A one-dimensional segmentation can be used, for example in a zigzag beam path based backlight illumination device of a holographic laptop-shaped computer. For example, a zigzag beam path having an incidence angle of 80.4 degrees showing an anamorphic beam stretching factor of 6 might be provided only along one dimension or direction, where the incidence angle of 80.4 degrees is the relative angle to the surface normal of a transparent plane-parallel substrate, which, for example, can be approx. 1 mm thick, and which is a core component of a zigzag beam path based illumination device. Therefore, the wave field segmentation shown in FIG. 4 might be representative for a zigzag beam path based illumination device. This also applies to imaging applications using segmentation of wave fields only along one dimension.

Figure 5:
FIG. 5 shows a superposition of frustum of pyramid-shaped intensity segments forming a homogeneous total intensity distribution.

FIG. 5 shows in a graphical representation a superposition of intensity segments, where each wave field segment corresponds to a frustum of pyramid. All wave field segments form a homogeneous total intensity distribution. The shown superposition of wave fields is only a cross section, which might be related to a plurality of different two-dimensional intensity distributions. In detail, FIG. 5 shows how a homogeneous intensity distribution can be generated by combining nested wave field segments with tailored intensity profiles placed at laterally shifted positions. Only a cross section is shown as in FIG. 4. The upper dot-and-dashed-line denotes the total intensity distribution, which is constant over a defined area. The term defined area refers to a size of e.g. several sub-holograms up to the entire SLM or display size. The lower part of FIG. 5 shows the intensity distribution of mutually incoherent wave field segments. These wave field segments have a plateau and a linear transition zone which is the overlap region or zone present between neighboured or adjacent wave field segments. Such a superposition can be used in illumination devices or in imaging devices using wave field segmentation. The intensity cross section shown applies to different footprints. In other words, several intensity distributions of the wave field segments used for the segmentation can have the same cross section. Therefore, plateau-type versions of circular intensity profiles, such as cylindrical cone-like intensity profiles, conical frustums, might be used as well as rectangular intensity profiles, such as square or hexagonal-shaped segments equivalent to a frustum of pyramid. In general, intensity profiles such as Gauss or cosine intensity profiles might also be used for the wave field segments to be combined within imaging and/or illumination-type embodiments. The wave field segments can also describe the addressable image intensity distribution which is related to the e.g. time-sequential addressable image segments of the image space of a projection-type display device or a projection-type display device which can be worn at the head of an observer viewing two-dimensional (2D) and/or three-dimensional (3D) image content. This can be a holographic display device or a two-dimensional display device using wave field segmentation. The cross section shown in this figure might also represent a one-dimensional segmentation. A one-dimensional segmentation can be used, for example, in a zigzag beam path based backlight illumination device applicable for a holographic laptop-shaped computer. For example, this means that the wave field segments might have a horizontal extension of approx. 6 mm and a vertical extension that corresponds to the height of the display device. In other words, a one-dimensional segmentation might be used along one dimension of the backlight unit, which is e.g. on a light guide and zigzag propagation of the light is provided. Here, zigzagging from the left to the right side of the displays backlight unit is presumed. The interpretation of the intensity distribution as one-dimensional representation of segmented wave fields can also be applied to imaging applications or imaging embodiments such as head-mounted display devices based on image projection and segmented decoupling. In other words, this intensity distribution based on optimized transition regions or zones present between the segments of wave fields can also be interpreted as representative approach for imaging applications based on image projection, which uses segmented decoupling or segmented imaging only along one dimension or direction, for example the horizontal direction. A segmentation used within the illumination of an SLM is equivalent to segmentation within the imaging beam path. Thus, a general method is disclosed that applies to both illumination and imaging. Effective wave field segmentation using a defined overlap applies to imaging of object points onto the retina of a human eye. Thus, FIGS. 1, 2 and 3 refer to this basic principle.

Figure 6:
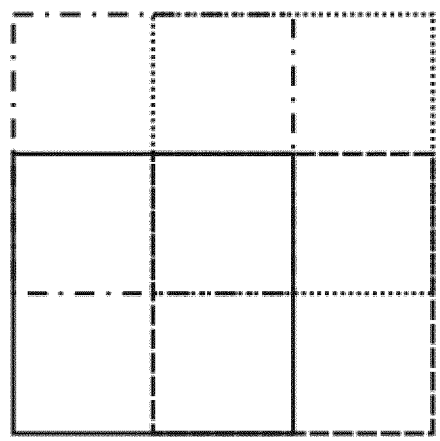
FIG. 6 shows a superposition of rectangular-shaped wave field segments forming a homogeneous total intensity distribution.

FIG. 6 shows a superposition of rectangular-shaped wave field segments forming a homogeneous total intensity. Thus, a top view of combined wave field segments is shown, which have square shaped footprints. Tailored intensity distributions are present within these footprints, which define the shape of the wave field segments superimposed. Wave field segments having a square-shaped footprint or a rectangular-shaped footprint might be used in order to generate a homogeneous intensity distribution. A homogeneous intensity distribution can be achieved by combining nested wave field segments with tailored intensity profiles placed at laterally shifted positions. Four combined wave field segments are shown in this top view. The preferred target is to obtain an overlap region or zone that is characterized by a constant intensity distribution. Here, the center area of the shown wave field segments representing the overlap region or zone should have a constant intensity. The four square-shaped basic segments are denoted by a solid line, a dashed line, a dotted line and by a dot-and-dashed line. This is only a part of a plurality of combined segments. For example, each of the four segments shown in FIG. 6 might be a part of a set of wave field segments put together in an edge to edge arrangement. A top view onto this group out of four groups of wave field segments looks like a quad paper structure. This means that four groups of wave field segments, each of them looking like a quad paper structure, are combined as shown in FIG. 6. Here, the shifts introduced are half a wave field segment width along the horizontal direction and half a wave field segment width along the vertical direction.

Figure 7:
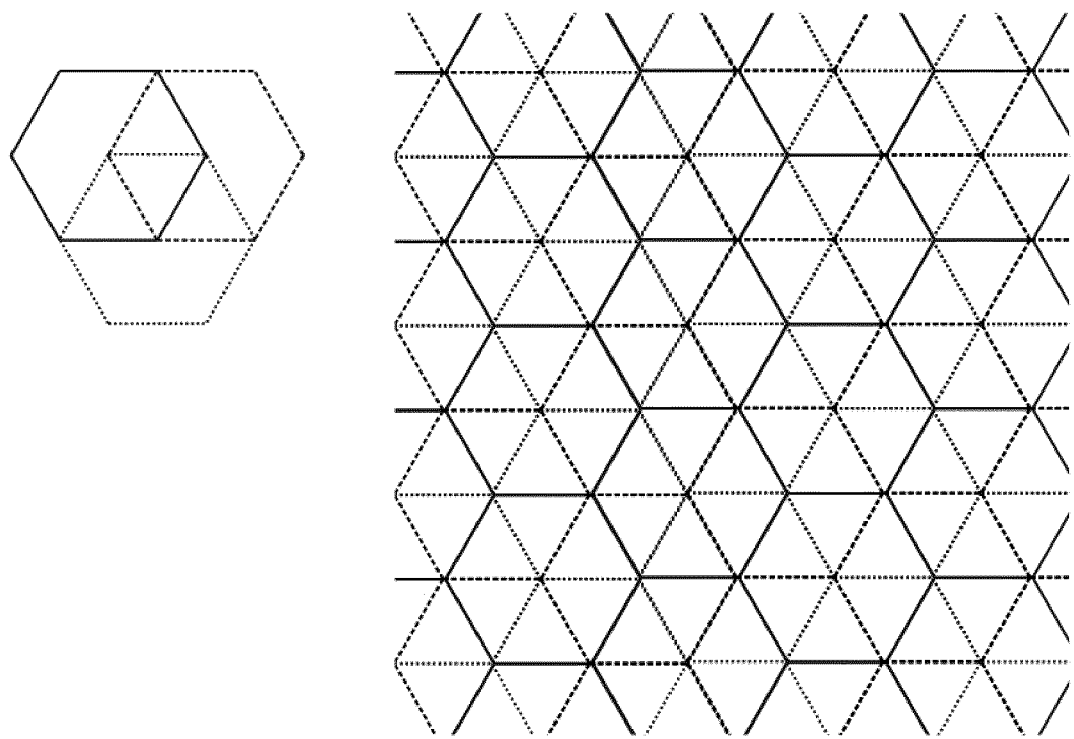
FIG. 7 shows at the left hand side a superposition of three hexagonal-shaped wave field segments and at the right hand side a superposition of a plurality of hexagonal-shaped wave field segments.

FIG. 7 shows at the left hand side a superposition of three hexagonal-shaped wave field segments and at the right hand side a superposition of a plurality of hexagonal-shaped wave field segments. The arrangement shown on the left hand side of FIG. 7 refers to the embodiment shown in FIG. 6. The left hand side shows a superposition of three wave field segments that have a hexagonal-shaped footprint. The center area that has contributions of all three wave field segments is a triangle. The required target might be to obtain an overlap region or zone that is characterized by a constant intensity distribution. Thus, the triangle should have a constant intensity within its entire dimension. Here, the three basic combined wave field segments using a partial overlap arrangement are denoted by using a solid line, a dashed line and a dotted line. Each of these three hexagonal-shaped wave field segments is a group member of a honeycomb-like edge to edge arrangement. At the right hand side of FIG. 7 the superposition of a plurality of such wave field segments is shown. Here, three honeycomb-like, edge to edge arranged groups are put together. These three groups are laterally shifted in the same way as shown at the left hand side of this figure. The three groups of wave field segments, which are nested into each other, are denoted by solid, dotted and dashed lines. The correct lateral placement of the wave field segments has to be chosen and the intensity profiles of the individual wave field segments have to be optimized in order to obtain the required design intensity distribution. The correct lateral placement of the wave field segments is obtained by the correct scanning of the illumination, which also means by using the use of a correct temporal synchronization of the scanning and the light modulation, that is, to switch on the light source at the right time. Temporal error means lateral error here. The optimization of the intensity profile is carried out by minimizing the obtained difference to a plateau-type intensity distribution during the superposition of the overlapped wave field segments, which is disclosed further below.

Figure 8:
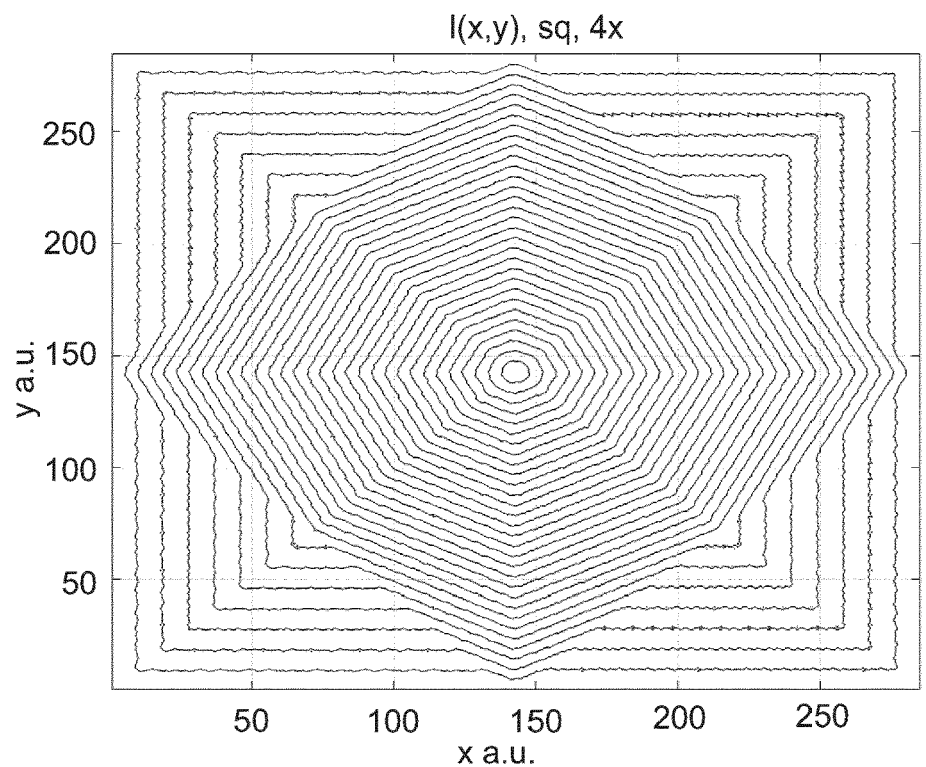
FIG. 8 shows an intensity distribution of a rectangular-shaped wave field segment providing a homogeneous total intensity distribution.

FIG. 8 shows in a top view contour plot an intensity distribution of a rectangular-shaped wave field segment providing a homogeneous total intensity distribution if superimposed with additional wave field segments as shown generally in FIG. 6. The footprint of the represented wave field segment can be rectangular or square. In other words, the wave field segments used might be shaped like a rectangle or a square.

Figure 9:
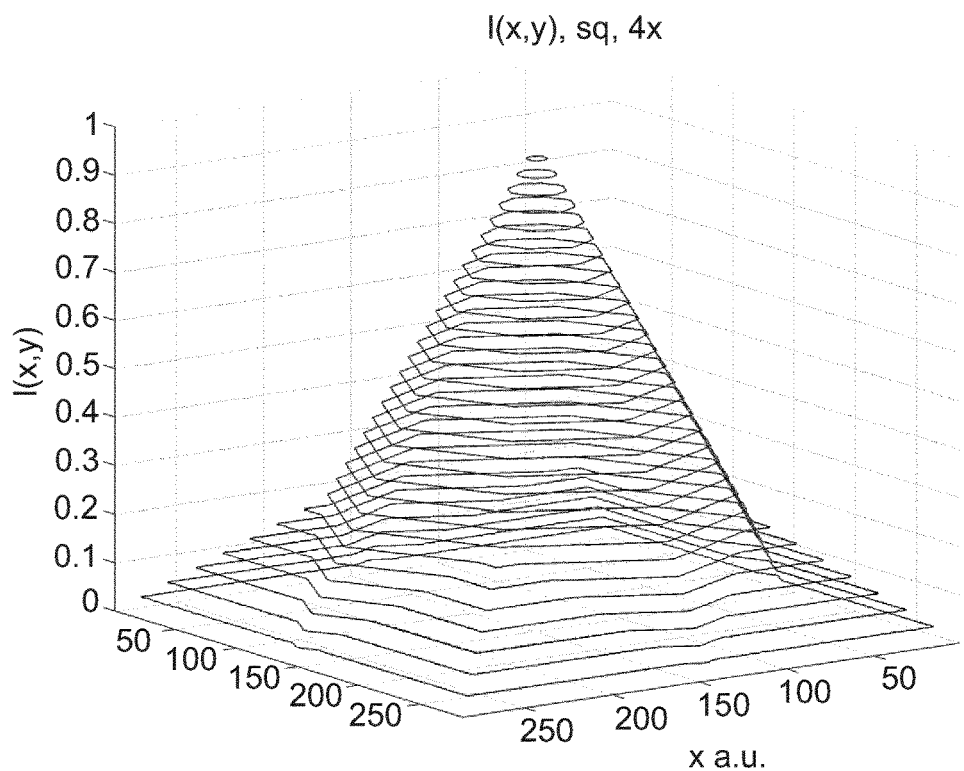
FIG. 9 shows an intensity distribution of a rectangular-shaped wave field segment providing a homogeneous total intensity distribution in a three-dimensional contour plot.

FIG. 9 shows in a three-dimensional contour plot an intensity distribution of a rectangular-shaped wave field segment providing a homogeneous total intensity if superimposed with additional wave field segments as shown generally in FIG. 6. The intensity distribution is a three-dimensional plot of the intensity distribution shown in FIG.

8. This intensity distribution can be a basic intensity distribution for rectangular footprints and square footprints. Wave field segments that have this intensity distribution and that are arranged as shown in FIG. 6 will generate a total intensity distribution that is constant. This can be used as basic optical functionality within illumination applications and/or imaging applications.

Figure 10:
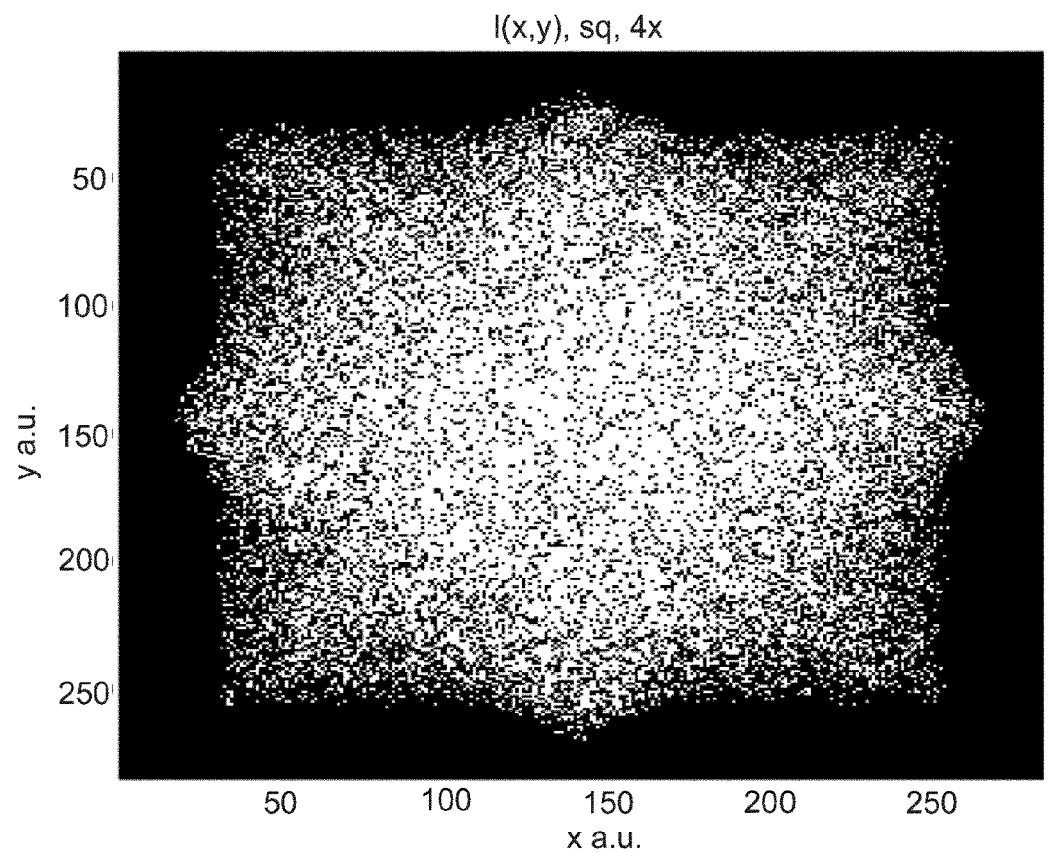
FIG. 10 shows an intensity distribution of a rectangular-shaped wave field segment providing a homogeneous total intensity distribution as a black and white raster image.

In FIG. 10 an intensity distribution of a rectangular wave field segment is illustrated providing a homogeneous total intensity if superimposed with additional wave field segments as shown generally in FIG. 6. This intensity distribution is shown in a black and white random raster. More precisely, FIG. 10 shows the intensity distribution that is shown in FIGS. 8 and 9 in a top view plot as a binary black and white image obtained by using randomized dithering. The intensity distribution has a maximum intensity that, for example, is normalized to a value of 1 (one) in its center and an intensity value of 0 (zero) in its boundary area.

FIG. 11 shows in a top view contour plot an intensity distribution of a hexagonal-shaped wave field segment providing a homogeneous total intensity distribution if superimposed with additional wave field segments as shown generally in FIG. 7. This means that three groups of honeycomb-like edge to edge arrangements can be used which are superimposed in order to form a required intensity distribution by using of overlap regions or zones. The footprint of the represented wave field segment is hexagonal-shaped.

Figure 12:
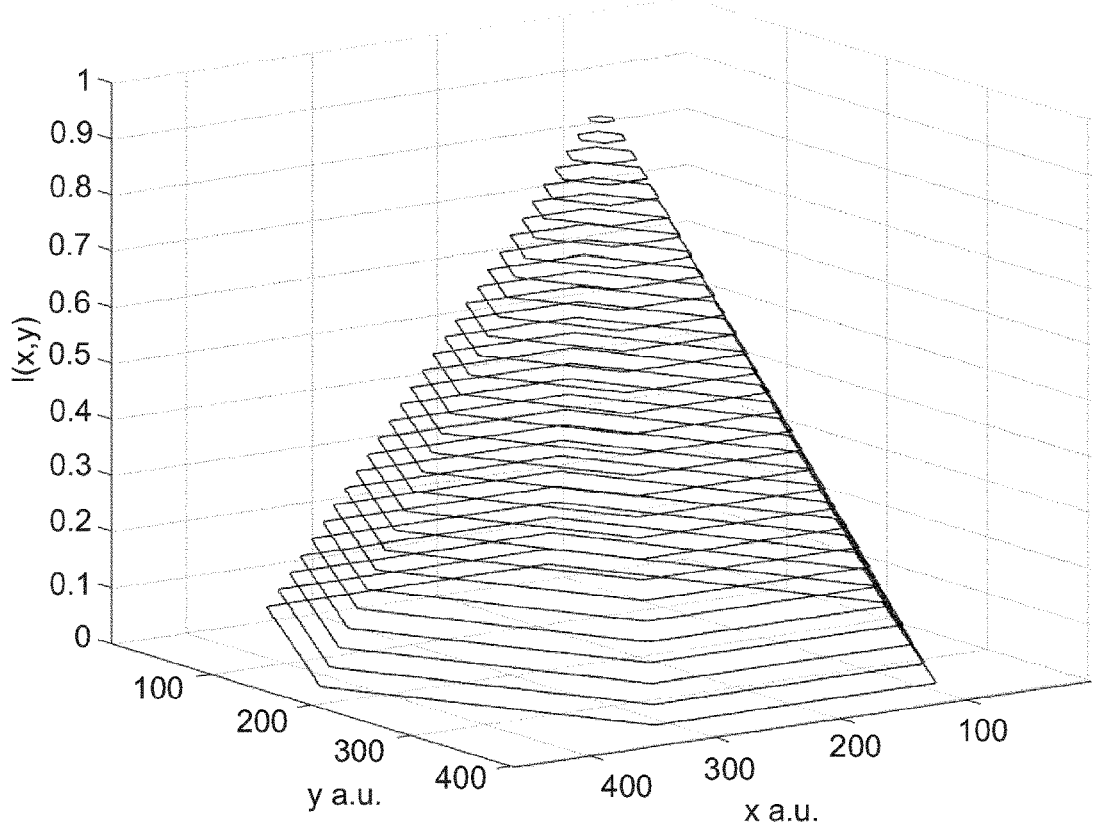
FIG. 12 shows an intensity distribution of a hexagonal-shaped wave field segment providing a homogeneous total intensity distribution in a three-dimensional contour plot.

In FIG. 12 a three-dimensional contour plot of an intensity distribution of a hexagonal-shaped wave field segment is shown. The hexagonal-shaped wave field segment provides a homogeneous total intensity distribution if superimposed with additional wave field segments as shown generally in FIG. 7. Thus, FIG. 12 shows the intensity distribution shown in FIG. 11 as top view already, as a three-dimensional contour plot. It might also be continued to tailor this basic intensity distribution for hexagonal-shaped footprints in order to be adapted e.g. to octagonal-shaped or circular-shaped footprints. Wave field segments having this intensity distribution and arranged as shown in FIG. 7 will generate a total intensity distribution that is constant. This can be used as basic optical functionality within illumination applications and/or imaging applications.

Figure 13:
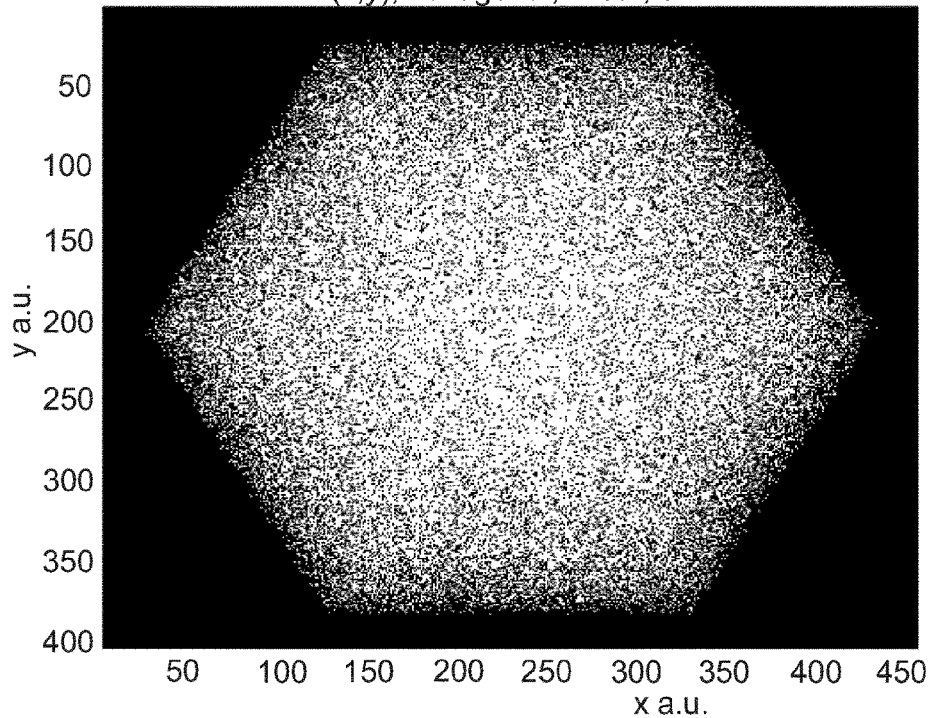
FIG. 13 shows an intensity distribution of a hexagonal-shaped wave field segment providing a homogeneous total intensity distribution as a black and white raster image.

FIG. 13 shows an intensity distribution of a hexagonal-shaped wave field segment providing a homogeneous total intensity distribution if superimposed with additional wave field segments as shown generally in FIG. 7. This figure illustrates a black and white representation of the intensity distribution shown in FIGS. 11 and 12 and obtained by using a random raster. In other words, the intensity distribution of FIGS. 11 and 12 is shown as a binary black and white image obtained by using randomized dithering. The intensity distribution has a maximum intensity which is normalized to an intensity value of 1 (one) in its center and an intensity value of 0 (zero) in its boundary area.

Figure 14:
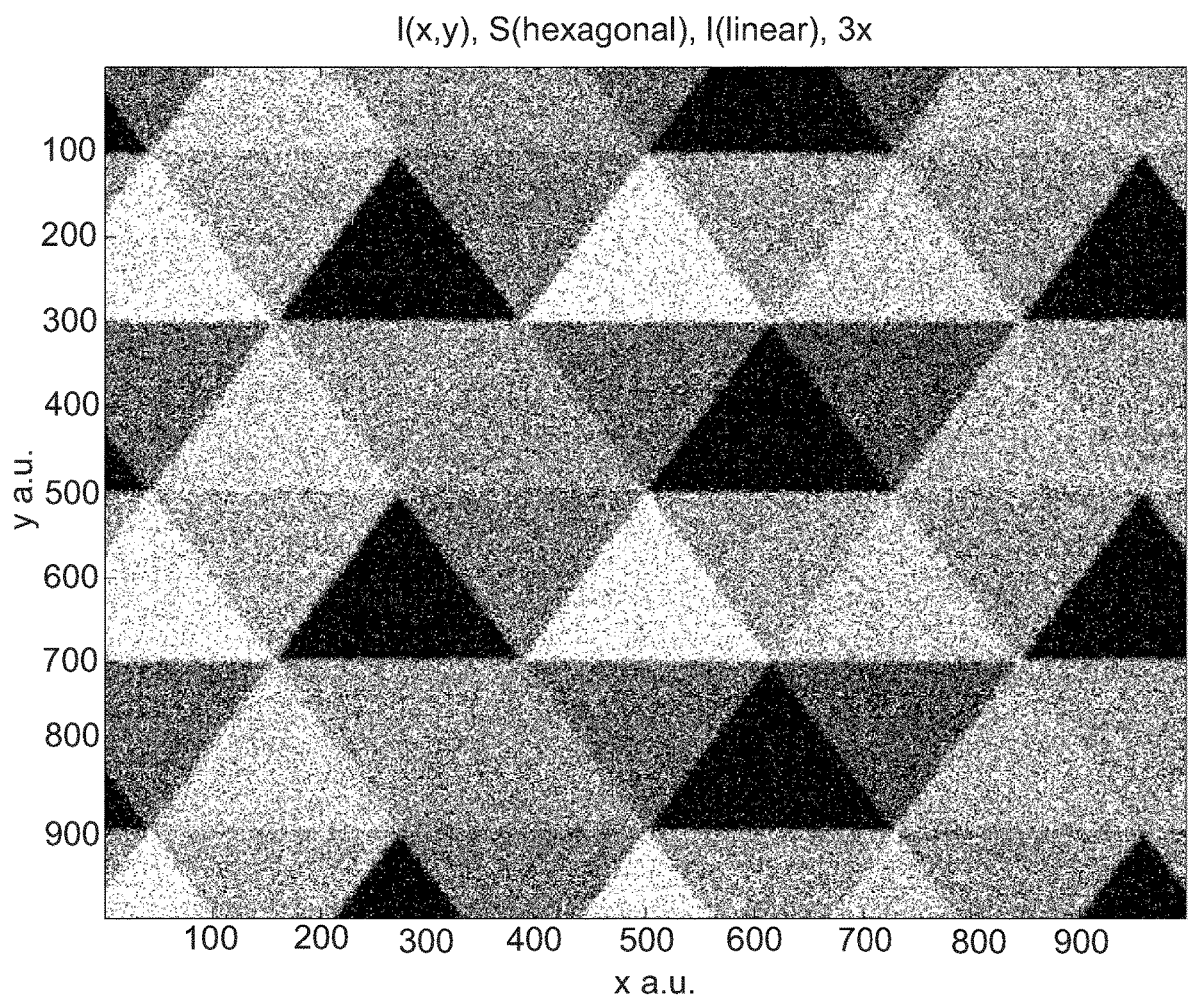
FIG. 14 shows the sum of hexagonal-shaped intensity distributions relating to FIG. 7 In a black and white raster image.

FIG. 14 shows a total intensity distribution of nested hexagonal-shaped wave field segments similar to FIG. 7 as a black-gray-and-white figure obtained by using a random binary (black and white only) raster. A slight offset of the individual wave field segments is used in order to visualize the generation of the total intensity distribution. Without an offset a homogeneous intensity distribution is obtained that does not show any visible segmented structure. As shown, each individual hexagonal segment has six sub-segments. The intensity distribution of the six segments of each individual hexagonal segment decreases from the center to the rim of the hexagonal segment in a linear way. This pattern is obtained by using an arrangement of nested hexagonal-shaped wave field segments as shown in FIG. 7. A slightly lateral deviation from an ideal hexagonal grid is introduced. The deviation from a mean intensity value of 1 (one) is within a range of ±2%. The gray scale-like distribution shows that only small intensity variations exist even if slightly lateral deviations from the ideal hexagonal grid are present. The non-ideal placement of the segments was only introduced for visualization purpose, here. Thus, it can be seen that the total intensity distribution is generated by the general arrangement shown in FIG. 7. In practice, slight deviations from the ideal grid of the superposition of the wave field segments can also be provided due to slight misalignment. It can be seen that slightly lateral misalignments might be tolerable. As already disclosed before, the shown image of FIG. 14 is a binary black and white image obtained by using randomized dithering. Thus, a binary black and white image is obtained which represents a gray scale-like intensity distribution.

Figure 15:
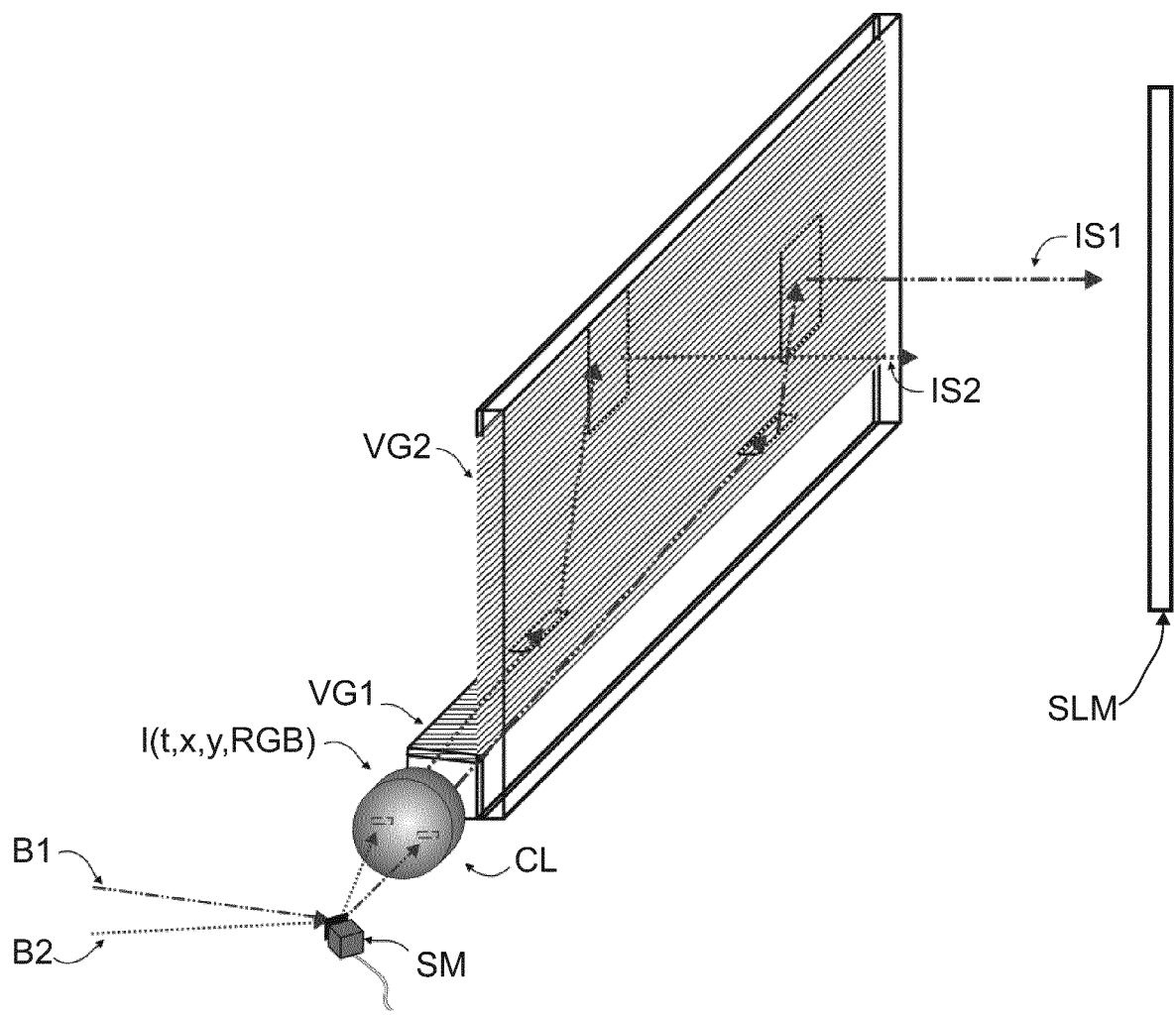
FIG. 15 shows an illumination device using a segmentation of wave fields.

FIG. 15 shows an illumination device provided in an apparatus for imaging or generating two-dimensional and/or three-dimensional objects according to the invention. Two light beams B1 and B2, for example laser beams, emitted by two light sources (not shown here) propagate within the illumination device from the left hand side of the drawing onto a scanning mirror element SM. The light beams B1 and B2 might hit the scanning mirror element SM at the same position or point. Thus, the cross section of two light beams or wave fields might be the surface of the scanning mirror element SM. The scanning mirror element SM is arranged in a front focal plane or close to the front focal plane of a collimation unit CL, here for example a collimation lens. The collimation unit CL collimates the light beams or propagating wave fields. The two small rectangular segments provided within an aperture of the collimation unit CL identify two illuminated zones which are here a part of the collimation unit only, that is, at least as long as a fixed time is considered. The scanning mirror element SM can be used in order to provide such illuminated zones as shown within the entire aperture of the collimation unit. An intensity distribution I(t,x,y,RGB) is present behind the collimation unit CL, seen in the direction of propagation of light. The term t means here that a dynamic intensity distribution which is dependent on the discrete time t is introduced. The terms x and y indicate the coordinates of the plane referred, which is the exit plane of the collimation unit CL. The collimated light beams or collimated wave fields propagate to a volume grating VG1. For example, an entrance angle of the light beam onto the volume grating VG1 can be 84.26 degrees. Such an entrance angle would result in a 10× anamorphic beam stretching factor. This is illustrated by the two rectangular shaped segments or zones present at the exit plane of the volume grating VG1. The volume grating VG1 redirects the beams and introduces an anamorphic beam stretching along the horizontal direction. The light propagating behind the volume grating VG1 enters a further volume grating VG2. The further volume grating VG 2 also redirects the light beams or wave fields and introduces an anamorphic beam stretching along the vertical direction. The light propagating behind this further volume grating VG2 is used to illuminate the SLM. For each primary color RGB (red, green, blue) a defined volume grating has to be used. The geometry shown here is equivalent to three volume gratings, that is, two for each primary color.

In other words, FIG. 15 shows an embodiment which can be used in order to realize a procedure of providing an illumination plane by using wave field segments. The illumination plane is the exit plane of the further volume grating VG2. Hence, an embodiment is shown which enables temporal providing of illuminated zones in the illumination plane. In order to reduce the complexity of the drawing or for the sake of convenience only the combination of two primary light sources is shown. Of course, it is possible to combine more than two light sources, for example three light sources each emitting light of a distinct wavelength. The wave fields generated by two light sources propagate to the scanning mirror element SM. In general, the scanning mirror element SM can be illuminated with a plurality of wave field segments which might be represented by using light beams. This means that, for example, M times N light beams might overlap within the plane of the scanning mirror element SM. Thus, for example, 20×10 light beams can be generated by an array of 20×10 light sources such as laser diodes (LD). Although in FIG. 15 only two wave fields represented by the beams B1 and B2 are shown a plurality of wave field can be combined as disclosed. The scanning mirror element SM is arranged in the front focal plane of the collimation unit CL. The light emerging from the scanning mirror element SM hits the collimation unit CL. The two small rectangular shaped segments or zones define the footprint of the wave field segment present in this plane. Behind the collimation unit CL collimated wave fields are present. The collimated wave field might be described by the intensity distribution I(t,x,y,RGB), where I is the intensity, t is the time, x and y are the x- and the y-coordinates. RGB labels the primary colors used, red, green and blue, which might be e.g. related to the wavelengths of 445 nm, 520 nm and 645 nm. For the temporal providing of illuminated zones in an illumination plane and/or imaging plane gaps could be present for a defined time. Fast scanning is used to present a homogeneous intensity distribution to an observer. The faster the scanning is provided the less the number of wave field segments to be used has to be provided. As shown the collimated wave field described by the intensity distribution I(t,x,y,RGB) enters the volume grating VG1, preferably a Bragg diffraction based volume grating. The entrance angle is e.g. 84.26 degrees which introduces an anamorphic beam stretching factor of ten along one direction. For example, by using an anamorphic wedge-type illumination device a plastic material such as polymethylmethacrylate (PMMA) might be used in order to avoid a costly anti-reflection coating required for a large angle of incidence on the volume grating VG1. Thus, the volume grating VG1 might be attached to a PMMA rod. The light propagating behind the volume grating VG1 will hit the further volume grating VG2, preferably a Bragg diffraction based volume grating, at a large entrance angle, for example 84.26 degrees. Thus, ten times anamorphic beam expansion will be introduced along the vertical direction. To avoid the weight which might be added by using e.g. a reasonable thick PMMA plate an air-type wedge might be used for the larger second part of the illumination device. Thus, in front of the further volume grating VG2 an anti-reflection coating might be used which is formed e.g. by twenty dielectric layers. Finally, at the exit plane of the illumination device shown in FIG. 15 largely stretched wave field segments are present. Here, two resulting exit wave field segments, which represent two anamorphic stretched intensity distributions, are labelled with IS1 and IS2. These two wave field segments IS1 and IS2 illuminate the SLM following the illumination device. During the two-dimensional scanning operation of the scanning mirror element SM, the combined primary light sources, e.g. a set of individually controlled laser diodes, can be modulated in a time-sequential and synchronized scheme.

For each image frame to be generated which also applies to each sub-frame of the primary colors red, green and blue the ideal intensity distribution can be provided. This type of local dimming is also capable of high dynamic range (HDR). The scanning approach allows the use of a wide range of intensity distributions which represent the individual wave field segments. Thus, e.g. Gauss distributions might be used which are emitted from light sources such as laser diodes. This means that no additional wave field shaping might be required.

Figure 16:
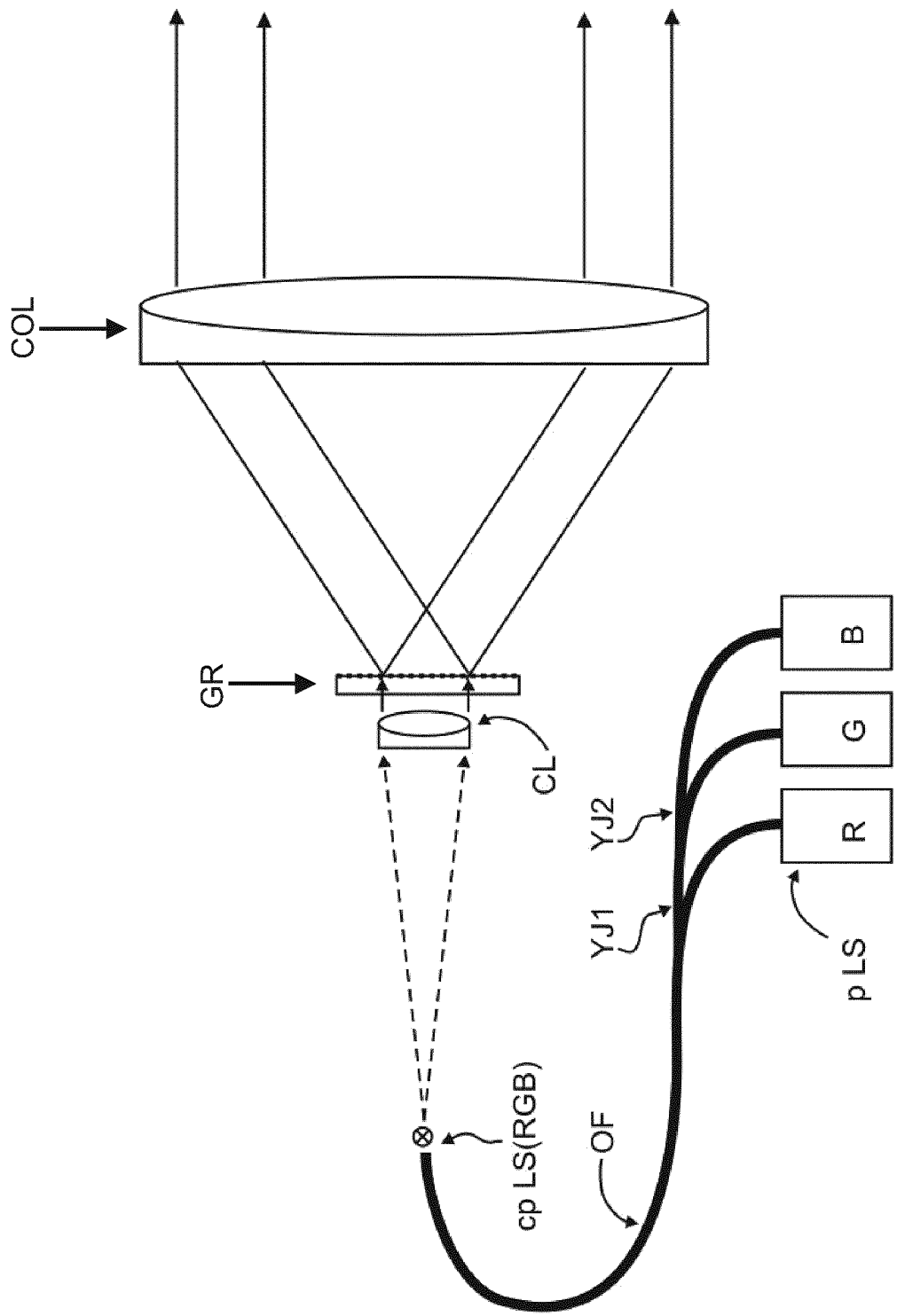
FIG. 16 shows an illumination device comprising three light sources emitting the three primary colors RGB and providing wave field segments.

FIG. 16 shows an embodiment of a device which can be used in order to realize temporal illumination by means of segments. This arrangement can be arranged preferably in front of the volume grating VG1 of FIG. 15. A collimation unit CL is shown which can be used in front of a wedge-type illumination device. For the sake of simplicity, only two wave field segments are shown which propagate behind this collimation unit CL, seen in the direction of propagation of light. The collimation unit CL can be used for temporal scanning of wave field segments illuminating an SLM. A plurality of wave field segments can be generated. The light intensity can be balanced out between the diffraction orders generated in a diffraction pattern.

A primary light source pLS might comprise three laser diodes emitting the primary colors required. These individual light sources or laser diodes are denoted by R, G and B. The light of the primary colors RGB is combined by using so-called Y-junctions, here YJ1 and YJ2. An optical fibre OF is used to transport the light to a plane which acts as a combined primary light source cpLS(RGB) comprising all primary colors RGB. An increased number of Y-junctions can also be used in order to provide a combination of a larger number of light sources or lasers or laser diodes. Thus, several light sources such as laser diodes can be used for each primary color. The light emerging from this combined primary light source plane cpLS(RGB) is collimated by using the collimation unit CL. Behind this collimation unit CL a grating GR, for example an active-type diffraction grating, is arranged. The grating GR comprises individually controlled electrodes or group-type controlled electrodes. This grating GR can be a liquid crystal (LC) grating which has polarization dependent diffraction efficiency and which uses in-plane rotating LC molecules. An exit plane of the grating GR is provided in a front focal plane of a further collimation unit COL. This further collimation unit COL is provided to transform the entrance wave field to a collimated wave field. The end of the optical fibre OF might also be placed directly in front of the grating GR, preferably an active-type polarization dependent LC grating.

This arrangement shown in FIG. 16 can provide wave field segments which can be scanned laterally and which can be changed in the intensity. Two crossed LC gratings can provide two-dimensional scanning. A plurality of further grating arrangements might be used. For example, three LC gratings might be used which are stacked by using a relative rotation of the electrode lines of 120 degrees each. For comparison, two crossed gratings can be used with a relative rotation of 180 degrees. In addition to the main task of the active-type diffractive beam splitting which is used here curvatures can be added to the angularly distributed wave field segments. This also might be used to compensate for aberrations or angular dependent focal corrections.

Figure 17:
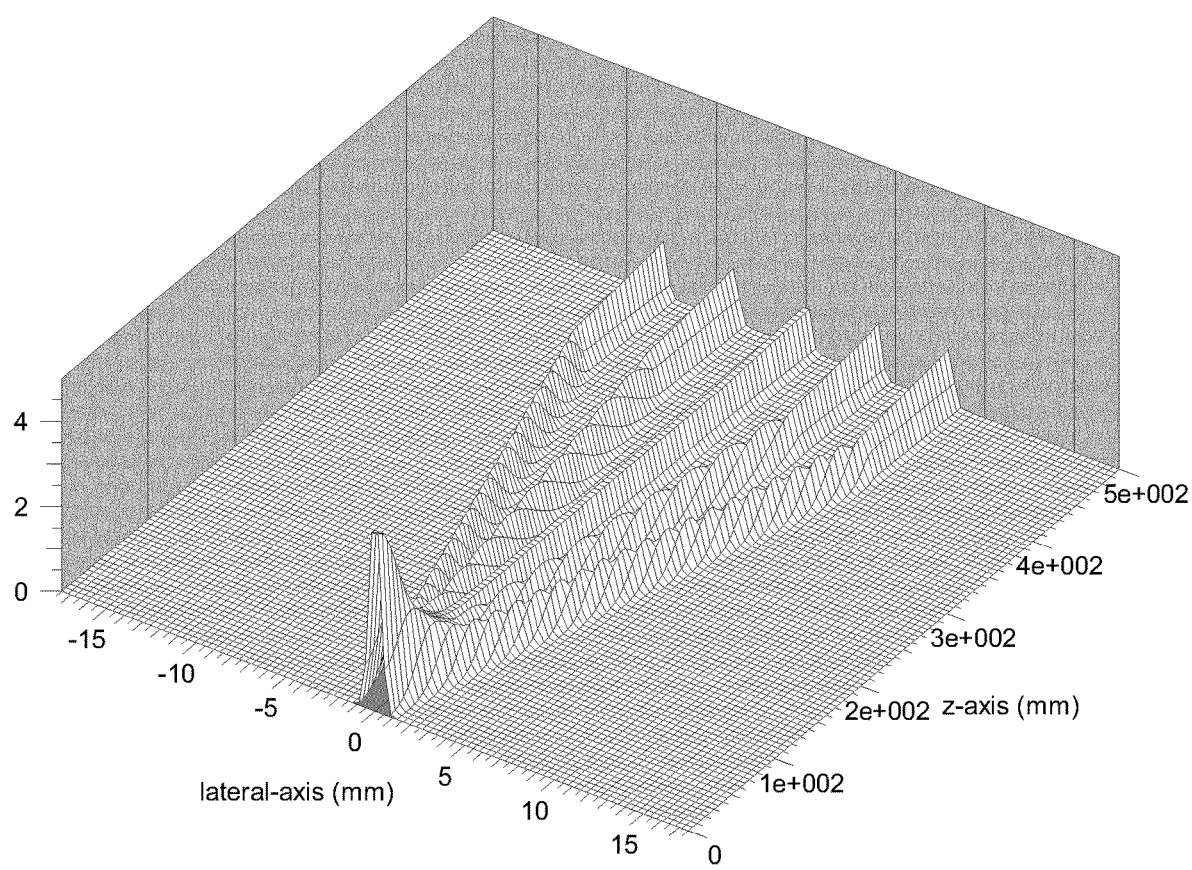
FIG. 17 shows a three-dimensional plot of a spatial intensity distribution of five Gaussian laser beams emerging from a light source plane.

A three-dimensional diagram of a simulation of a spatial intensity distribution of five Gaussian light beams emerging from a light source plane arranged at z=0, this is the z-axis in mm, is illustrated in FIG. 17. The combined light source is placed at z=0. A scanning mirror element might be arranged at z=0. As shown, in this position of the scanning mirror element the highest intensity is present. In other words, a high intensity is present at the scanning mirror, as e.g. shown in FIG. 15. This example refers to the embodiment shown in FIG. 15 using a scanning mirror element SM. The scanning mirror element can change an exit angle emerging from the light source present in the light source plane in two dimensions in a reasonable fast way. In other words, the scanning mirror element is used in order to span the angular acceptance range of a collimation unit or collimating lens, which might be a part of an illumination device. Within an illumination time window referred to one image frame, e.g. a few milliseconds, the exit plane of the collimation unit has to be provided with or has to include the intensity distribution required for the illumination of the SLM. Here in FIG. 17, z is the longitudinal propagation length of the light along the local optical axis of the illumination device. The longitudinal axis of propagation or z-direction is denoted by z-axis. For example, at the propagation distance of approx. z=400 mm a collimation unit can be arranged which can have a focal length of $f_{CL}$=400 mm. As can be seen in FIG. 15, the single light beams or wave fields are redirected by the collimation unit CL and propagate parallel to each other behind the collimation unit CL. Thus, the single light beams or wave fields would change the direction of propagation at z=400 mm, for example. In addition to the redirection of the single light beams or wave fields, which are controlled individually in their intensity, a slight divergence if present can be compensated by the collimation, too. The collimation unit CL adds a local spherical phase term to the individual light beams or wave fields. In FIG. 17 the entire propagation length of the light or wave field shown is approx. 500 mm. This is the entire length of the z-axis shown. It can be seen that the individual light beams or wave fields do not change their beam diameter significantly. This is an example for e.g. using temporal scanning of a plurality of collimated light beams in combination with temporally controlled and synchronized intensity modulation of individual light sources $LD_{ij}$ such as laser diodes which are parts of a two-dimensional array of light sources used to illuminate the SLM.

In FIG. 17 the intensity of the individual light beams is the same. This means that the five light beams are turned on and have thus the same optical power. A plurality of light beams can be scanned along two directions. Thus, the entire exit plane of the collimation unit can be provided or filled with the intensity distribution required. In the case of providing a homogeneous intensity distribution without local dimming all light beams have the same intensity. This means that a bundle of equidistant light beams having identical intensity is scanned within an entrance plane of the SLM to be illuminated homogeneously. For arbitrary intensity distributions scanning and modulation of individual light sources such as laser diodes can be combined. For example, by using this temporal scanning based implementation of local dimming a high dynamic range and a high brightness can be obtained. In other words, the images can be very bright and they can show a high bit depth, that is, high brightness can be obtained and small intensity steps can be obtained, too. This means a high dynamic range (HDR) image reconstruction.

Figure 18:
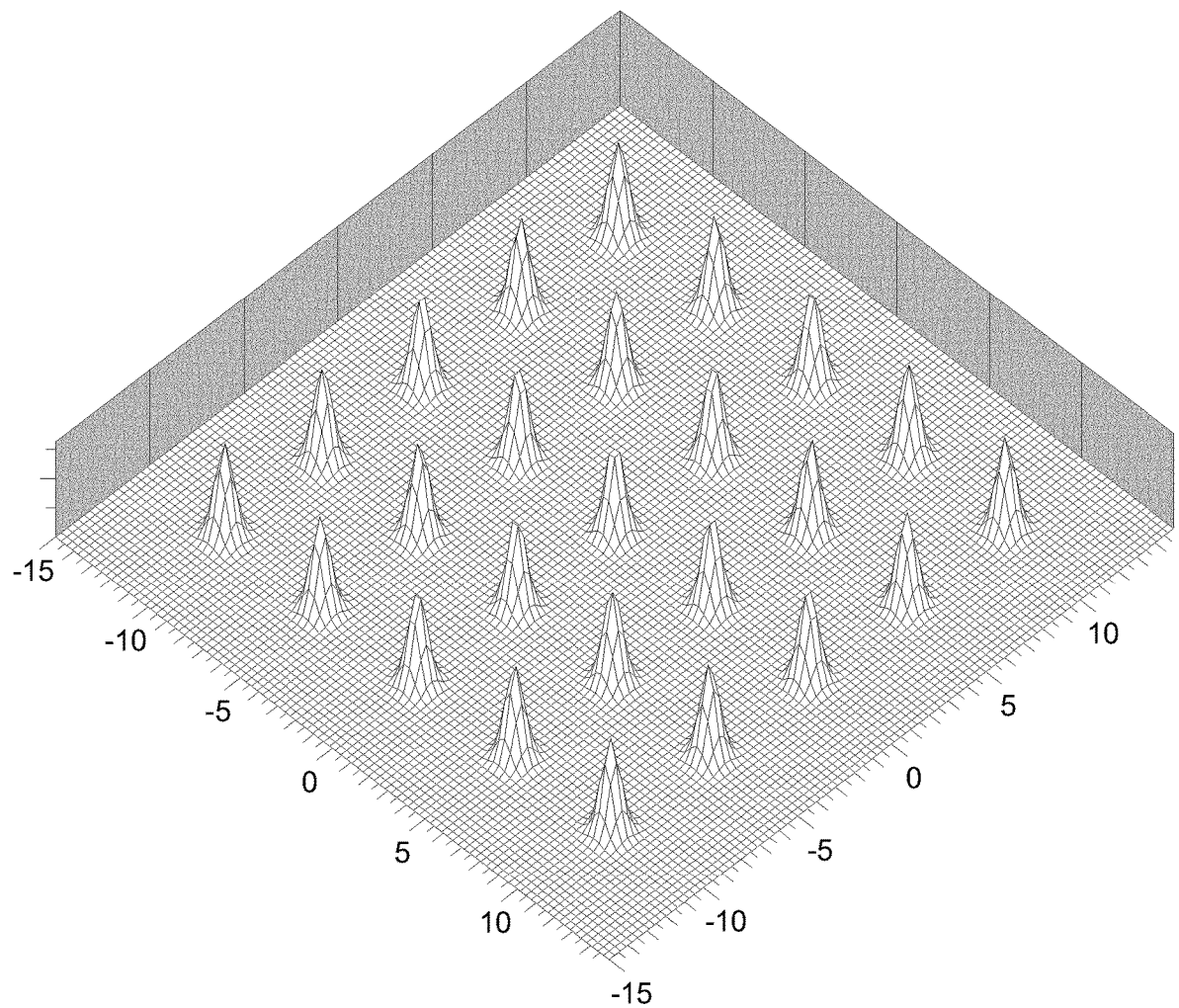
FIG. 18 shows a three-dimensional plot of an intensity distribution generated by five times five Gaussian laser beams.

FIG. 18 shows a three-dimensional diagram of a simulation of an intensity distribution present at approx. 500 mm behind an exit plane of a collimation unit arranged at approx. 400 mm behind a scanning mirror element. Here, five times five Gaussian light beams are shown. Grid spacing between the light beams is equidistant. The beam diameter is approximately 1 mm. The grid spacing, which is slightly larger than 6 mm in this embodiment, is significant larger than that. In other words, here a beam diameter of 1 mm is used in combination with a raster grid spacing of 6 mm. Thus, the mutual gap, which is present between adjacent beams, is 5 mm. This intensity distribution might be present in front of a wedge-type illumination device which is e.g. shown in FIG. 15. As shown in FIG. 15 the use of a volume grating such as a Bragg diffraction based volume grating enables two times anamorphic beam stretching with a factor e.g. of ten or twenty. Thus, a beam diameter of approx. 1 mm behind the collimation unit might be stretched anamorphically to a beam diameter of approx. 10 mm or even up to approx. 20 mm in front of the SLM to be illuminated. This also means that the transition zones of the segmented illumination, which is introduced by a plurality of temporally scanned and individually modulated light beams, comply with the condition of being larger than approx. 3 mm. Within a single illumination segment of this example of FIG. 18, which is e.g. a single light beam, the distance between a maximum intensity to an intensity of zero (0) is at least 5 mm, or even much larger if a beam stretching factor of twenty is used within the wedge-type illumination device. Here, the entrance plane of the SLM is used as the reference plane. The plane present behind the collimation unit can be stretched ten times or twenty times before it is used to illuminate the SLM of an apparatus such as a holographic display device. The relatively large grid spacing enables a high spatial resolution of the local dimming and the high dynamic range imaging. This means that the local dimming has a high resolution. A condition relating to a small beam diameter and high mutual gap spacing present between the light beams is a fast two-dimensional scanning which has to be applied in order to temporally provide the entire illumination plane with the required intensity distribution. It is also possible to use smaller beam diameters such as approx. 0.8 mm or less and increase significantly the number of light sources such as laser diodes used e.g. within a two-dimensional matrix array-type arrangement of light sources $LD_{ij}$. For example, the indices i and j defining the individual light sources LD such as laser diodes of the two-dimensional matrix array-type arrangement might run from one to ten each. This means that ten times ten light sources instead of five times five light sources can be used. Hence, faster scanning and faster intensity modulation can be used in order to reduce the number of light sources used. This also means that a single light source might be used for the temporal scanning procedure.

Figure 19:
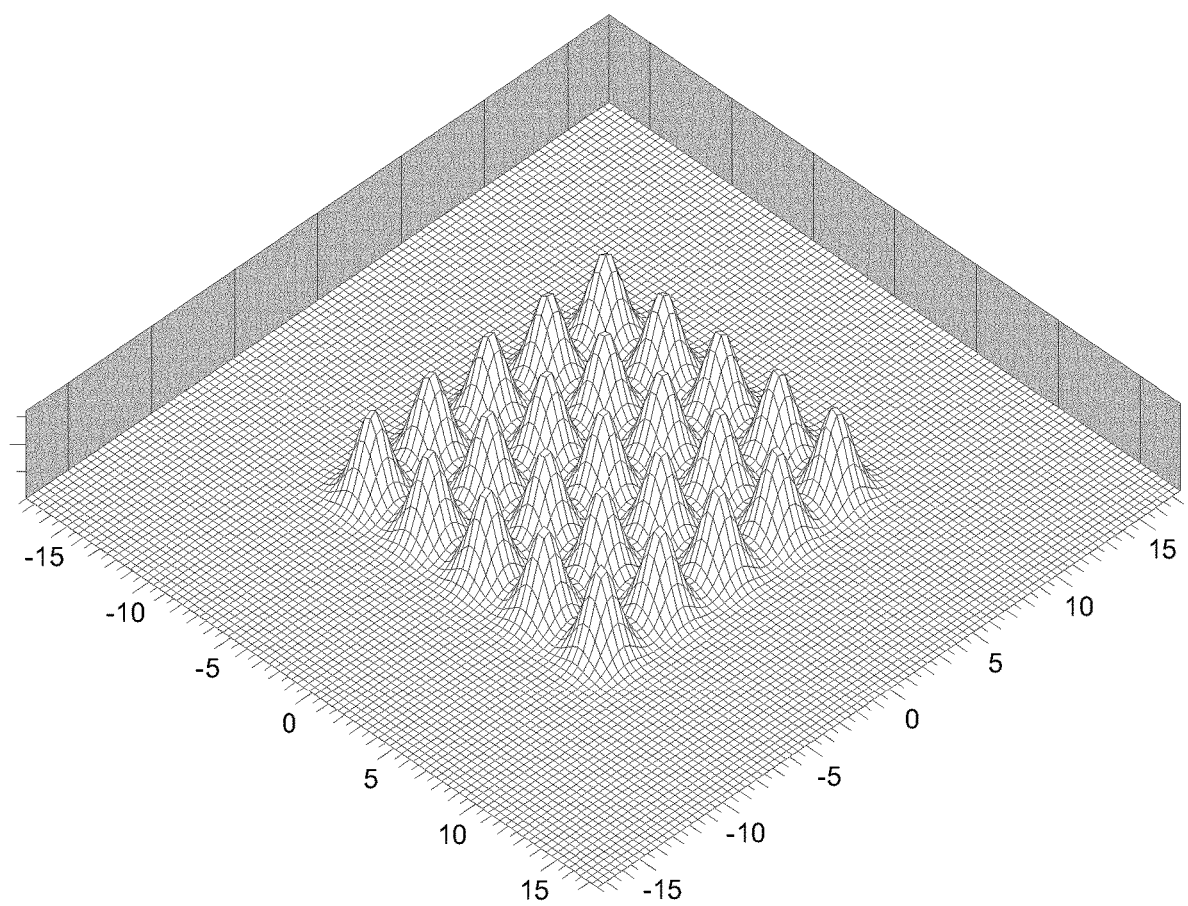
FIG. 19 shows a further three-dimensional plot of an intensity distribution generated by five times five Gaussian laser beams.

In FIG. 19 a three-dimensional diagram of a simulation of an intensity distribution present at approx. 500 mm behind an exit plane of a collimation unit placed at approx. 400 mm behind a scanning mirror element is shown. As in FIG. 18, five times five Gaussian light beams are shown. Here, too, the grid spacing between the light beams is equidistant. However, the beam diameter is approximately 1.5 mm. The grid spacing between the single light beams being slightly less than 4 mm, is larger than the beam diameter. In other words, a beam diameter of 1.5 mm is used in combination with a raster grid spacing of 4 mm. Thus, the mutual gap, which is present between adjacent beams, is 2.5 mm. This intensity distribution shown in FIG. 19 might be present in front of a wedge-type illumination device, which is e.g. shown in FIG. 15. As shown in FIG. 15 the use of a volume grating such as a Bragg diffraction based volume grating introduces an anamorphic beam stretching with a factor, for example, of approx. ten to twenty. Thus, a beam diameter of 1.5 mm present behind the collimation unit might be stretched anamorphically to a beam diameter of approx. 15 mm or up to approx. 30 mm in front of the SLM to be illuminated. This also means that the transition zones of the segmented illumination, which is introduced by a plurality of temporally scanned and individually modulated light beams comply with the condition of being larger than approx. 3 mm. Within a single illumination segment, which, for example, is a single light beam, the distance between a maximum intensity to an intensity of zero (0) is at least approx. 8 mm or even much larger in the case of using a beam stretching factor of twenty within the illumination device. However, the point here is that the single light beams or wave field segments, which are present in front of an anamorphic illumination device such as in FIG. 15, or even anamorphic imaging unit, are stretched, e.g. by using a factor of ten. Thus, the relevant transition zone of the wave field segment, which might include intensity values from 1 to 0, is large enough, that is several millimeters instead of one millimeter. The entrance plane of the SLM is used as the reference plane. The plane present behind the collimation unit is stretched approx. ten times or twenty times before it is used to illuminate the SLM of an apparatus such as a holographic display device. Compared to the intensity distribution shown in FIG. 18 a reduced scanning speed is required and used. The velocity of the intensity modulation required for the light sources used is also reduced. In addition, the spatial resolution of the local dimming is reduced, too. Discrete embodiments are dependent on the discrete applications. This example of FIG. 19 shows that there is much room for parameter variations which can be used to adapt the discrete optical design of the beam combining device to the discrete display device product.

Figure 20:
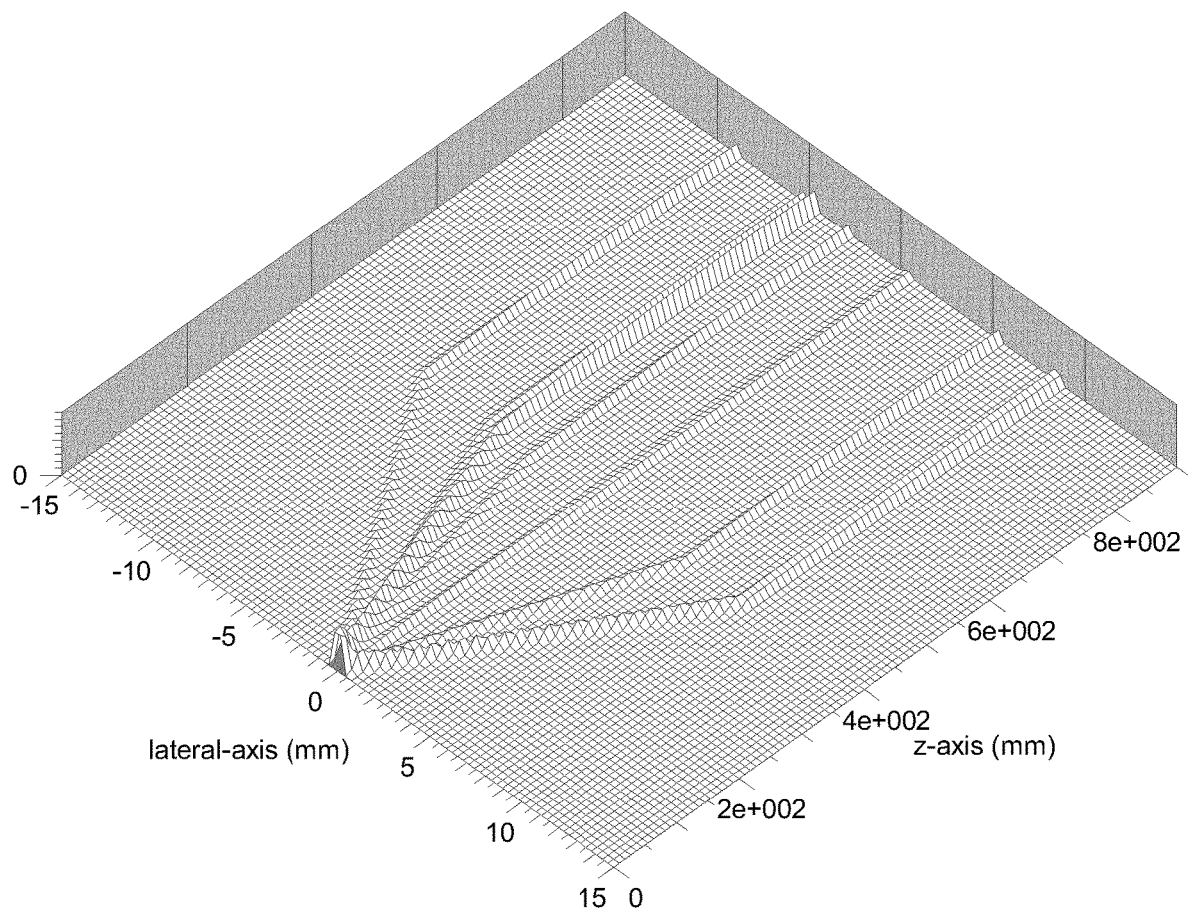
FIG. 20 shows a three-dimensional plot of an intensity distribution generated by six Gaussian laser beams, which propagate along the z-direction.

A three-dimensional diagram of a simulation of an intensity distribution generated by Gaussian light beams emerging from a light source plane placed at z=0 (which is the z-axis in mm) is shown in FIG. 20. For example, at z=0 a scanning mirror element might be arranged. An example is shown in FIG. 15, there the scanning mirror element SM is shown. The scanning mirror element can change the angle of the light present in the light source plane in two dimensions in a reasonable fast way. Within an illumination time window referred to one image frame, e.g. a few milliseconds, an exit plane of the collimation unit has to be provided or filled with the intensity distribution required for the illumination of the SLM. Here, z is the longitudinal propagation length of the light along the local optical axis of the illumination device. The longitudinal axis of propagation or z direction is denoted by z-axis. For example, at a propagation distance of approx. z=400 mm a collimation unit can be arranged, which can have a focal length of $f_{CL}$=400 mm. The single light beams are redirected by the collimation unit and propagate parallel to each other behind the collimation unit. Furthermore, the single light beams would change the direction of propagation at z=400 mm, for example. In addition to the redirection of the single light beams or wave fields, which can be controlled individually in their intensity, a slight divergence if present can be compensated by the collimation, too. The collimation unit can add a local spherical phase term to the individual light beams or wave fields. The entire propagation length of the light shown is approx. 900 mm. This is the entire length of the z-axis shown. It can be seen that the individual light beams do not change their beam diameter significantly. This, for example, is a concrete example for using temporal scanning of a plurality of collimated light beams in combination with temporally controlled and synchronized intensity modulation of individual light sources $LD_{ij}$ such as laser diodes. These light sources can be parts of a two-dimensional (2D) array of light sources such as laser diodes used to illuminate the SLM.

In FIG. 20 the intensity of the individual light beams or wave fields differs from each other and some of them may be even switched off completely. By using this temporal scanning based implementation of local dimming a high dynamic range (HDR) and a high brightness of the generated image can be obtained. Thus, parts of the SLM that represent a black zone within a three-dimensional (3D) scene may not be illuminated either. This also reduces the consumed optical power to a value that is really required. In the case of providing homogeneous intensity distribution without local dimming all light beams or wave fields have the same intensity. In this specific state all light sources such as laser diodes have the same optical output power. And, a bundle of equidistant light beams having identical intensity is scanned within an entrance plane of the SLM to be illuminated homogeneously. But the scanning by using different intensities of the individual light beams has the highest probability for the standard usage of an apparatus such as a display device. FIG. 20 refers to FIG. 17 which shows the intensity distribution in the case of non-intensity-modulated light beams.

Figure 21:
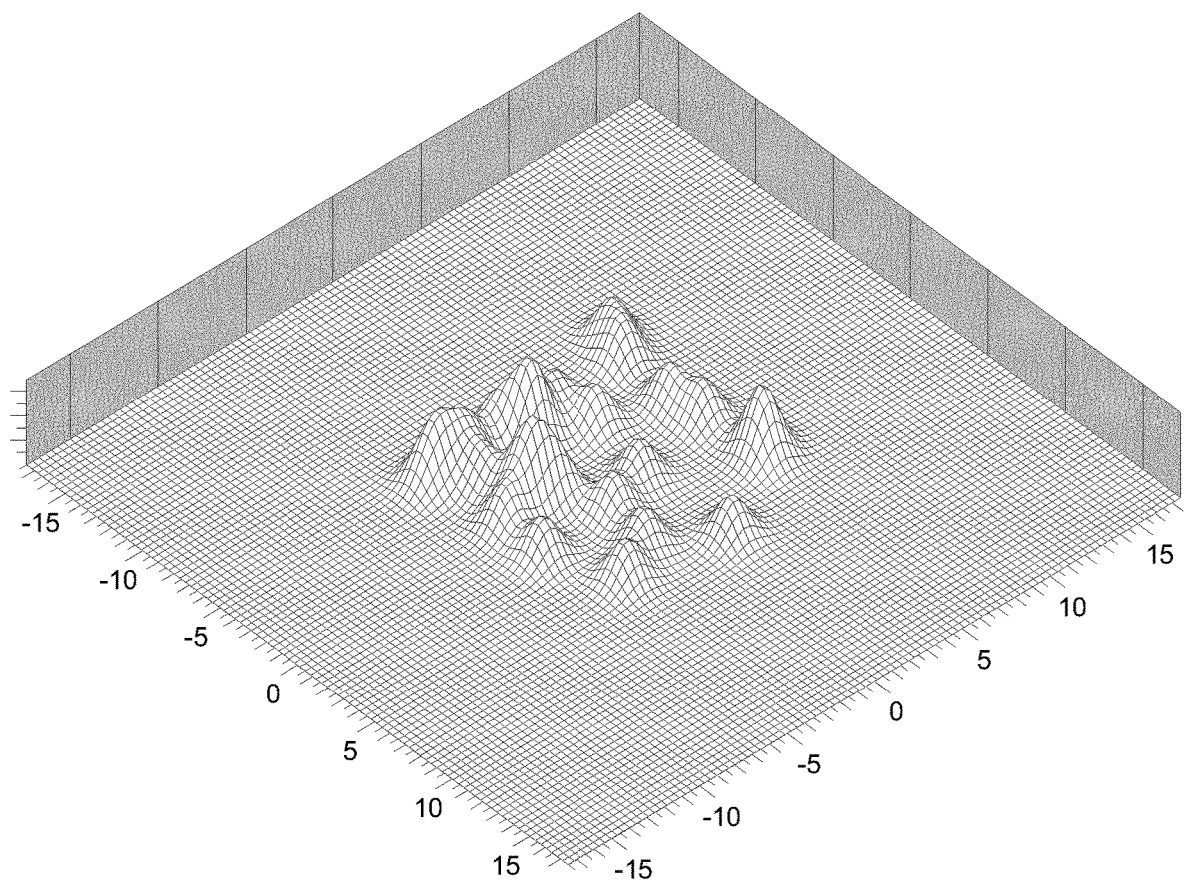
FIG. 21 shows a three-dimensional view of a temporally integrated intensity distribution.

FIG. 21 shows a three-dimensional diagram or view of a simulation of a temporally integrated intensity distribution present approx. at 500 mm behind an exit plane of a collimation unit. For further explanations it is pointed, for example, to FIG. 15. This figure illustrates that arbitrary intensity distributions can be provided by using a dynamically introduced local dimming of light. This is the temporally integrated intensity distribution a single SLM frame can be illuminated with. The integrating time can be, for example, in the millisecond range. Although the nominal grid spacing present between the single light beams might be fixed arbitrary intensity distributions can be obtained. This can be carried out by modulating the individual light sources such as lasers during the scanning procedure which takes place in a time frame being smaller or equal to a time frame required to illuminate the SLM. FIG. 21 shows an example for using temporal scanning of a plurality of collimated light beams in combination with temporally controlled and synchronized intensity modulation of individual light sources $LD_{ij}$ such as lasers or laser diodes. These light sources can be parts of a two-dimensional (2D) array of light sources which are used in order to illuminate the SLM of an apparatus such as a holographic display device.

Figure 22:
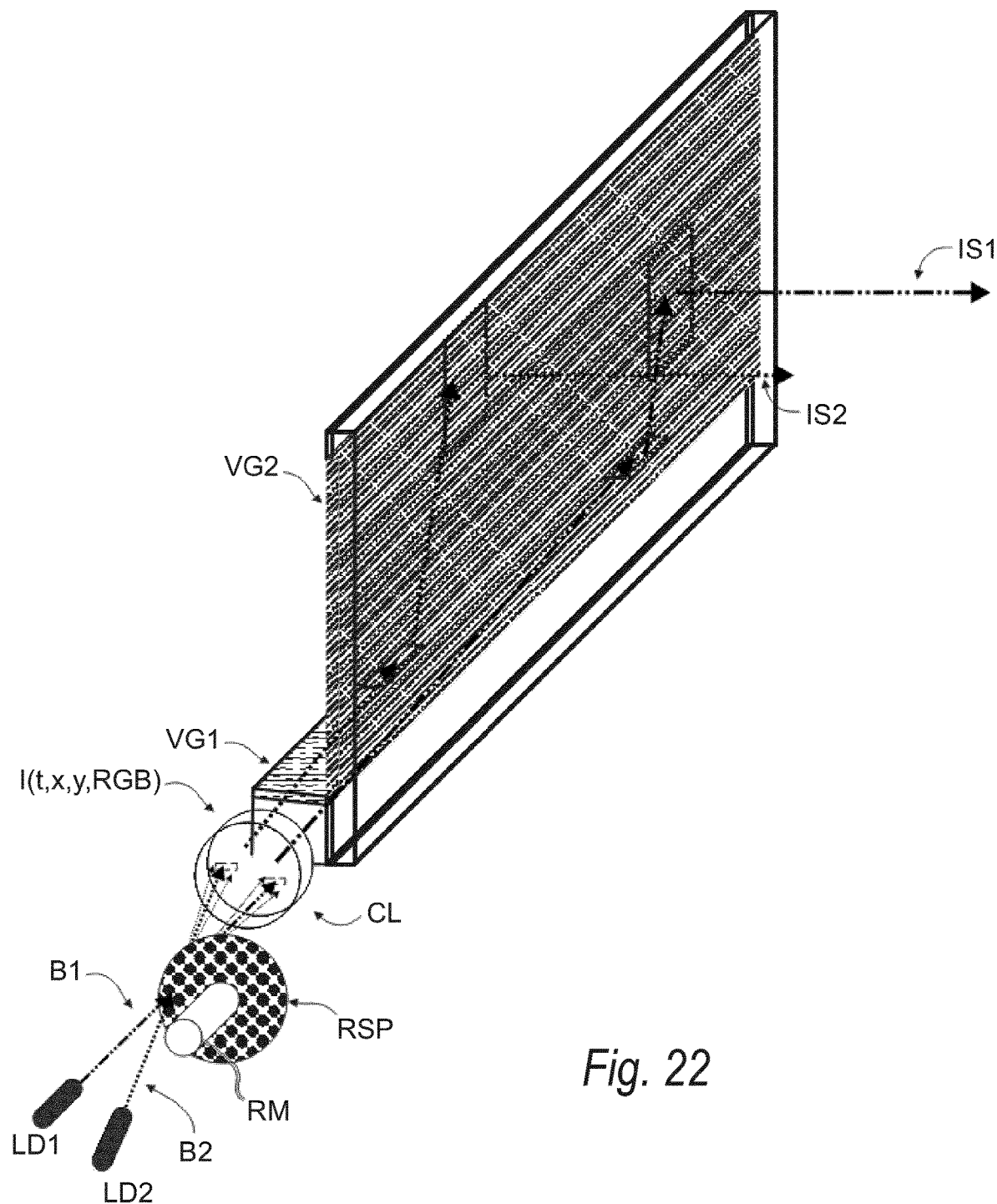
FIG. 22 shows an illumination device using a segmentation of wave fields according to the present invention.

In FIG. 22 a general embodiment of an illumination device of an apparatus for imaging of two-dimensional and/or three-dimensional objects is shown. Such an illumination device can be used in order to realize a procedure of providing an illumination plane by using wave field segments. This embodiment enables spatial providing or filling of the plane to be illuminated with wave field segments without the use of an angular scan. Compared to FIG. 15 showing a scanning capability provided by the scanning mirror element SM, a beam shaping element RSP is provided in FIG. 22. The beam shaping element RSP is designed here as a rotating scatter plate. Of course, it is possible to use other beam shaping elements. In order to reduce the complexity of the drawing only the combination of two primary light sources is shown. Two wave fields represented by the light beams B1 and B2 and generated by two light sources LD1 and LD2 propagate to the rotating scatter plate RSP. The rotating scatter plate RSP is mounted on a rotating motor RM.

The rotating scatter plate RSP can be replaced by different optical elements providing similar optical functionality. For example, a beam shaping diffuser might be used as beam shaping element and as an alternative to the scatter plate. Such a beam shaping diffuser can provide a top-hat intensity distribution or a flat-top intensity distribution. This may be an optimal optical functionality in the case of using a single light source. This means that the procedure of combining a plurality of light sources by using segmentation of the plane to be illuminated is not used. Although this might also be practical, it could be not optimal in the apparatus disclosed herein that is based on segmented illumination providing multi-light source combining capability. A flat-hat intensity distribution might be used that is larger in its extension than the size of an entrance aperture of the collimation unit in order to combine the light generated by several light sources such as laser diodes. But this would not be efficient for providing local dimming and high dynamic range imaging related to the local dimming procedure. For nested segmentation of wave fields using the required overlap of the illumination segments scatter profiles as e.g. shown in FIGS. 10 and 13 are preferred. Discrete parameters of the required overlap are dependent on the discrete display device product. As an example, for a direct view holographic display device this overlap might be as large as the size of the largest sub-hologram. Thus, local dimming and high dynamic range imaging can be provided in an optimal combination in combination with a plurality of individually controlled light sources such as laser diodes.

The plane of the rotating scatter plate RSP in FIG. 22 defines a plane of a secondary or extended light source to be collimated by the collimation unit CL. Thus, the plane of the secondary light source is placed in the front focal plane of the collimation unit CL. For a holographic display device it can be preferred to use a dynamic element in the plane of the secondary light source, which adds a dynamic phase distribution to this plane. This also means that static refractive beam shaping elements are not preferred regarding the use in this plane. A dynamic diffractive structure or a dynamic refractive structure can introduce both a beam shaping function and a dynamic randomized phase function, which is present within the plane of the secondary light source. Therefore, these two functions might also be provided by using two separated optical elements, a dynamic phase plate and a static refractive beam shaping element.

In general, the plane defining the secondary light source can be illuminated with a plurality of wave field segments which might be represented by using light beams here. This means that e.g. M times N light beams might overlap within the plane of the rotating scatter plane RSP or the secondary light source. Thus, for example, 20×10 light beams can be generated by an array of 20×10 light sources LD such as laser diodes. Although in FIG. 22 only two wave fields represented by the light beams B1 and B2 are shown a plurality of wave fields can be combined as disclosed. The light emerging from the rotating scatter plate RSP hits the following collimation unit CL. Two small rectangular shaped regions or zones shown on the collimation unit CL denote the footprint (or shape) of two wave field segments present within this plane of the collimation unit CL. The collimation unit CL collimates the wave fields so that collimated wave fields are present behind the collimation unit CL. The collimated wave field might be described by the intensity distribution I(t,x,y,RGB), where I is the intensity, t is the time, x and y are the x- and the y-coordinates. The intensity distribution I(t,x,y,RGB) is used as a reference which is provided behind the collimation unit CL. This intensity distribution will be stretched by the backlight unit, which follows within the beam path. RGB labels the primary colors red, green and blue, which, for example, might be related to the wavelengths 445 nm, 520 nm and 645 nm.

In other words, FIG. 22 shows an illumination device of an apparatus according to the present invention. Two light sources LD1 and LD2, e.g. lasers or laser diodes, emit two light beams B1 and B2. The two light beams B1 and B2 propagate to the rotating scatter plate RSP, which is mounted on the rotating motor RM. Then, the light beams might hit the rotating scatter plate RSP at the same location or position. Thus, the cross section of two light beams or wave fields might be at the rotating scatter plate RSP. The rotating scatter plate RSP can be arranged in the front focal plane or close to the front focal plane of the collimation unit CL. The collimation unit CL collimates generally the light beams or the propagating wave fields. The two small rectangular segments present within the aperture of the collimation unit denote the illuminated zones or regions that are a part of the collimation unit. Here, only two light beams are considered. The rotating scatter plate RSP introduces a reshaping of the primary wave fields that are incident on it. A plurality of light sources can be used in order to fill or provide the entire aperture of the collimation unit CL with light or precisely with wave field segments. The filling of the entire aperture of the collimation unit CL with light can be carried out by using the overlap procedure according to the invention.

Behind the collimation unit CL the intensity distribution I(t,x,y,RGB) is present. Here, t means that a dynamic intensity distribution is introduced, which is dependent on the discrete time t. The plurality of light sources used is modulated in time. Each light source might have its individual time dependent exit power, which is synchronized with the content provided by the SLM to be illuminated. Here, x and y denote the coordinates of the corresponding plane which is the exit plane of the collimation unit CL. The collimated light beams or collimated wave fields propagate then to a volume grating VG1. For example, the entrance angle onto the volume grating VG1 may be 84.26 degrees. This results in a 10× anamorphic beam stretching. The volume grating VG1 redirects the light beams or wave fields and introduces an anamorphic beam stretching along the horizontal direction. The light propagating behind the volume grating VG1 enters a further volume grating VG2. The further volume grating VG2 redirects the light beams or wave fields and introduces an anamorphic beam stretching along the vertical direction. The light propagating behind the further volume grating VG2 is used to illuminate the SLM. For each primary color RGB a defined volume grating should be used. The geometry shown in FIG. 22 is equivalent to three volume gratings, that is, two volume grating for each primary color.

The scatter plate SP increases the divergence of the wave field. The effect is that the wave fields propagating further to the next optical element, which is a collimating lens CL, will have a mutual overlap. The scatter plate is placed in the front focal plane of the collimating lens CL. The collimating lens CL collimates the light propagating from the scatter plate SP. Behind the collimating lens CL the wave fields related to different laser diodes LD1 to LDN have the required overlap.

Figure 23:
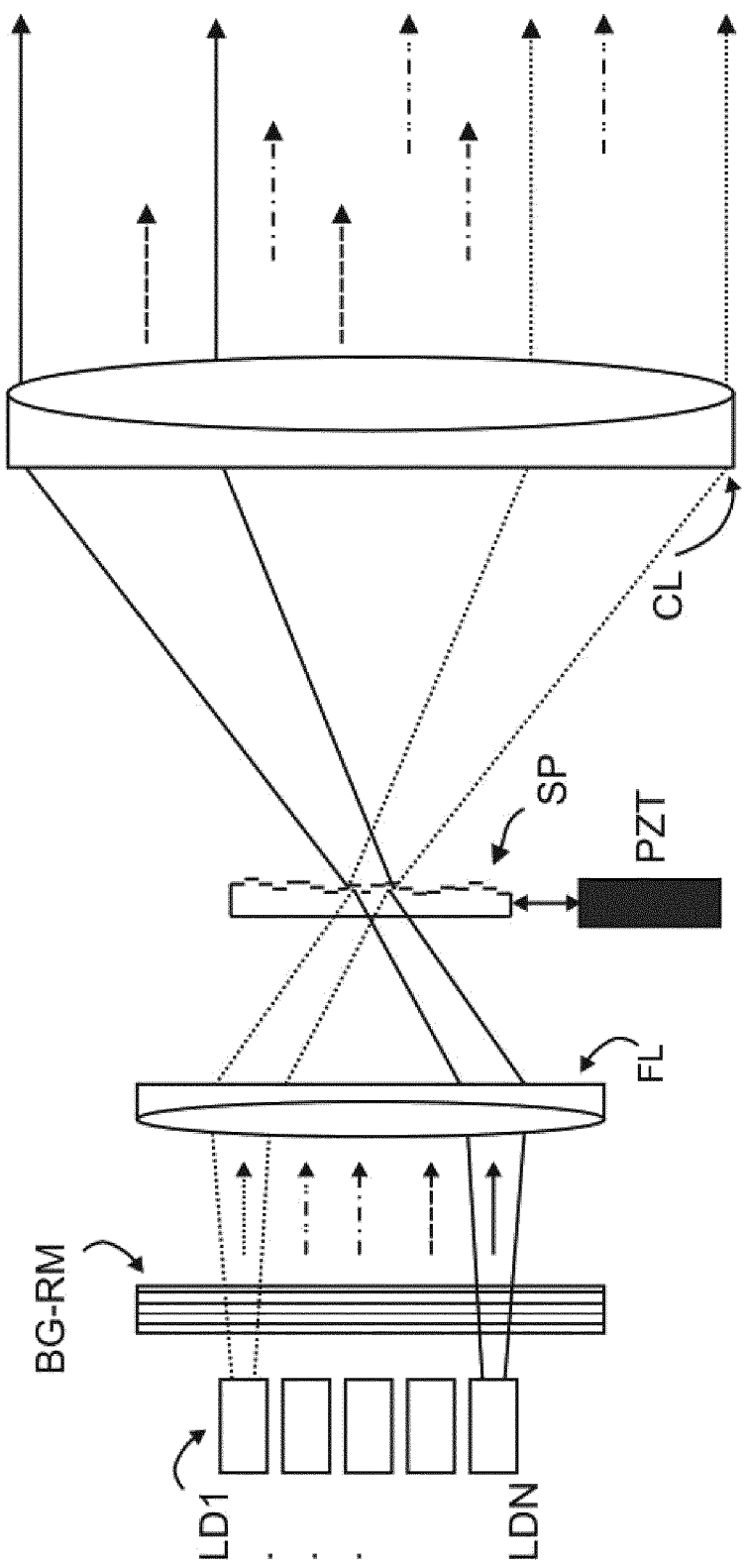
FIG. 23 shows an exemplary embodiment of an apparatus according to the present invention realizing a segmentation of wave fields and a combination of a plurality of light sources.

FIG. 23 shows an exemplary embodiment of an illumination device of the apparatus according to the present invention realizing a combination of a plurality of light sources $LD_{ij}$ such as laser diodes, which might be arranged as a two-dimensional matrix. The reference signs LD1 to LDN refer to a number of N light sources LD arranged at the left hand side of this figure. Light beams or wave fields relating to different light sources LD1 to LDN are denoted by using different lines as e.g. a dotted line, a double-dot-and dashed line, a dot-and-dashed line, a dashed line and a solid line. In order to provide a narrow spectral line width of e.g. 0.1 nm for each light source a volume grating BG-RM such as Bragg diffraction based volume grating working in reflection at perpendicular incidence can be provided following the light source array in the beam path. The width of the spectral line can be referred to as LA. Here, for example, LA=0.1 nm. The volume grating BG-RM operates as an exit mirror of individual resonators of the light source cavities. For example, distributed feedback laser diodes can be used as light sources, which have a periodic structure close to the resonator defining the wavelength emitted. In addition to the narrow line width of the radiation emitted the spectral position of the light lines is fixed within a range of e.g. 0.2 nm. The spectral position of the single light line can be referred to as $\Delta\lambda_0$. Here, for example, $\Delta\lambda_0$=0.2 nm. The implementation of a spectral stabilization ensures angular stability of the wave fields propagating to an eye of an observer, even in the case of using diffractive elements within the apparatus such as a holographic display device. Within holographic display devices the use of diffractive elements enables a small form factor.

The light emerging from the individual light sources propagates to a field lens FL. This field lens FL redirects the light onto a plane acting as plane of a combined light source, which is the secondary light source to be collimated further along the beam path. In this plane a beam shaping element is arranged. The beam shaping element can be designed as a scatter plate SP, here. The scatter plate SP can be laterally shifted by using a piezoelectric transducer PZT which is illustrated in FIG. 23 by using a double arrow connecting the piezoelectric transducer PZT and the scatter plate SP. The scatter plate SP is an important element in the apparatus. Several functions are provided by this scatter plate or beam shaping element. As a first function the scatter plate or beam shaping element causes that the entrance light beams are widened regarding their divergence angle. For example, a single Gaussian light beam illuminating the scatter plate might have a small value of the numerical aperture NA which is defined by a small angle of e.g. 5 degrees. Thus, a numerical aperture of NA=sin(5 degrees/2)=0.044 is very small, but this is only an exemplary value. Behind the field lens FL the light beam generated by several light sources LDN is slightly convergent and has an angle of convergence of e.g. 5 degrees. The light beam is slightly focussed then onto the scatter plate SP. Behind the scatter plate SP a divergence of the wave field or light beam generated out of this single light beam might have a divergence angle e.g. of 15 degrees. Discrete values of the divergence depend on discrete embodiments of the apparatus according to the present invention. It should be pointed out that for the example shown in FIG. 23 the angular spread is increased significantly by using the scatter plate SP or the beam shaping element. The effect of that is that the wave fields propagating further to a next optical element, which can be a collimation unit CL, have a mutual overlap. This points out further that one function of the scatter plate SP or beam shaping element is to generate a defined overlap being present between the wave fields originally generated by different light sources. The scatter plate or beam shaping element increases the angular spread of each wave field. The scatter plate or beam shaping element can be arranged in a front focal plane of the collimation unit CL. As can be seen in FIG. 23 the collimation unit CL collimates the light emerging from the scatter plate SP. Behind the collimation unit CL the wave fields relating to different light sources LD1 to LDN have a required overlap. As a second function the scatter plate SP or beam shaping element introduces beam shaping. For example, Gaussian or elliptical entrance light beams have to or can be transformed into light beam segments or wave field segments having intensity distributions as e.g. shown in FIG. 10 or 13. It could not be advantageous to use a flat-top beam shaping. A flat-top intensity distribution is contrary to the intensity profiles described above. Flat-top intensity distributions cannot fulfil the requirements. The scatter plate SP or beam shaping element has a phase profile or a phase structure. The phase profile of the scatter plate SP is optimized in order to transfer the light beam profiles of the light sources into required light beam profiles for segmented illumination or segmented imaging. This explains that one function of the scatter plate is to introduce tailored beam shaping. To increase the angular divergence and to introduce the tailored beam shaping is a functionality which can be combined within the scatter plate SP or beam shaping element. This shows that no simple standard scatter plate or beam shaping element can be used in the apparatus according to the invention.

The plurality of light sources such as laser diodes forming the primary light source array can be arranged e.g. in a rectangular or in a hexagonal grid related to the arrangements of segments shown in FIGS. 6 and 7. Thus, the grid type used for the arrangement of the primary light source array defines the beam shaping function which has to be provided by the scatter plate SP or beam shaping element.

A further function of the scatter plate SP or beam shaping element is the providing of reasonable fast dynamic phase variation within the plane of the extended or secondary light source, which is collimated by the collimation unit CL. A reasonable fast dynamic phase variation means that, for example, at least more than ten scatter plate-type phase distributions are present within a time frame required to illuminate a single frame of the SLM. The use of a rotating scatter plate or beam shaping element as shown in FIG. 22 can provide this. This means that dynamic phase patterns should be used in combination with temporal integration in the scatter plate. Fast movement of the scatter plate or beam shaping element perpendicular to the optical axis of the illumination device can be provided, for example, by using a rotating motor or a piezoelectric transducer. The range of the dynamic phase scattering to be provided might be a discrete application, for which $\Delta\phi(\text{dynamic})\geq\pm\pi/4$ might also be sufficient. The term "phase scattering", which describes preparation within a plane of e.g. a combined light source, means phase randomization with high spatial frequencies.

MEMS (micro-electro-mechanical system) piston mirror-type arrays can also be used in a reflective illumination arrangement. A dynamic scatter plate working in reflection may provide a step height of at least half a wavelength, which is e.g. 640 nm/2=320 nm, here for the red and thus the longest wavelength, in order to realize a required dynamic phase variation of $\Delta\phi_{(dynamic)}\geq\pm\pi/2$.

LC (liquid crystal) based phase modulating SLM, which can be used in the plane of the secondary light source to be collimated, that is as replacement of the scatter plate SP, are probably not fast enough for the majority of display applications. A thin foil mounted at a piezoelectric transducer can provide fast randomized phase modulation and a small form factor at the same time.

Figure 24:
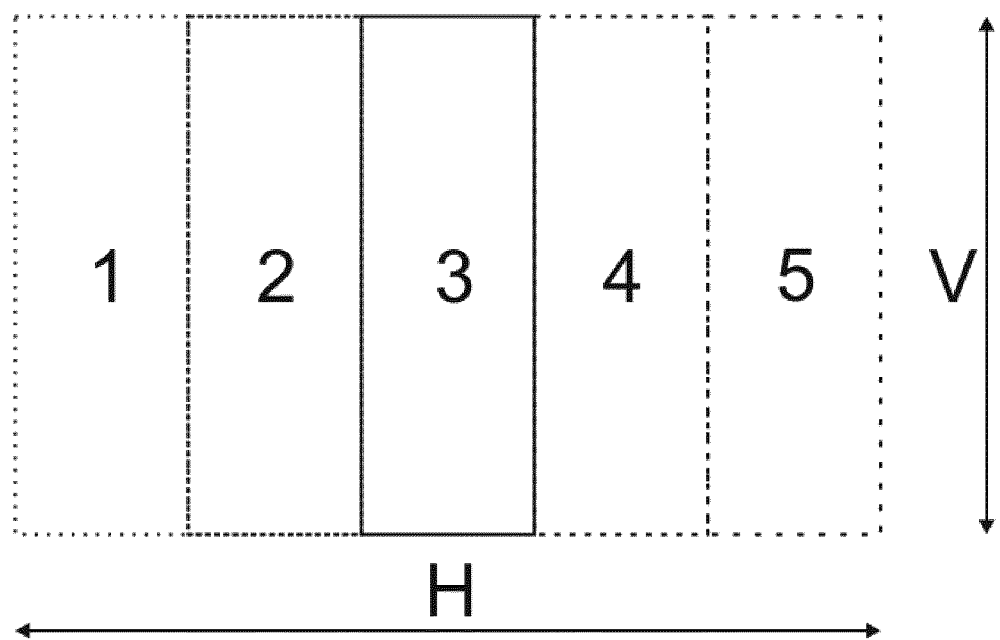
FIG. 24 shows five wave field segments without an overlap in a general way.

In FIG. 24 a segmentation of wave fields is shown for a head-mounted display device (HMD) or a head-up display device (HUD, e.g. used in cars). In this figure five wave field segments are illustrated that do not show an overlap or that do have a small overlap only in a general way. These wave field segments might be used in a HMD or a HUD and are thus equivalent to a segmentation of the field of view presented to an eye of an observer. The entire field of view is spanned by using five segmented wave fields. As can be seen, a horizontal field of view H is larger than a vertical field of view V. The numbers 1 to 5 denote the different zones or region of the wave field. These are general segments that might be used in imaging applications or in illumination applications. A small overlap might be present regarding alignment tolerances. In this case a few pixels of the virtual image segments might overlap. The small overlap being present can be calibrated out and compensated by using, for example, data of a lock-up table containing calibration based correction values. This small overlap might be sufficient in order to avoid gaps within the virtual image scene. But this small overlap due to alignment and tolerance issues is not sufficient in order to provide a high definition imaging experience, e.g. within a head mounted display device making use of light guides and segmented decoupling.

Figure 25:
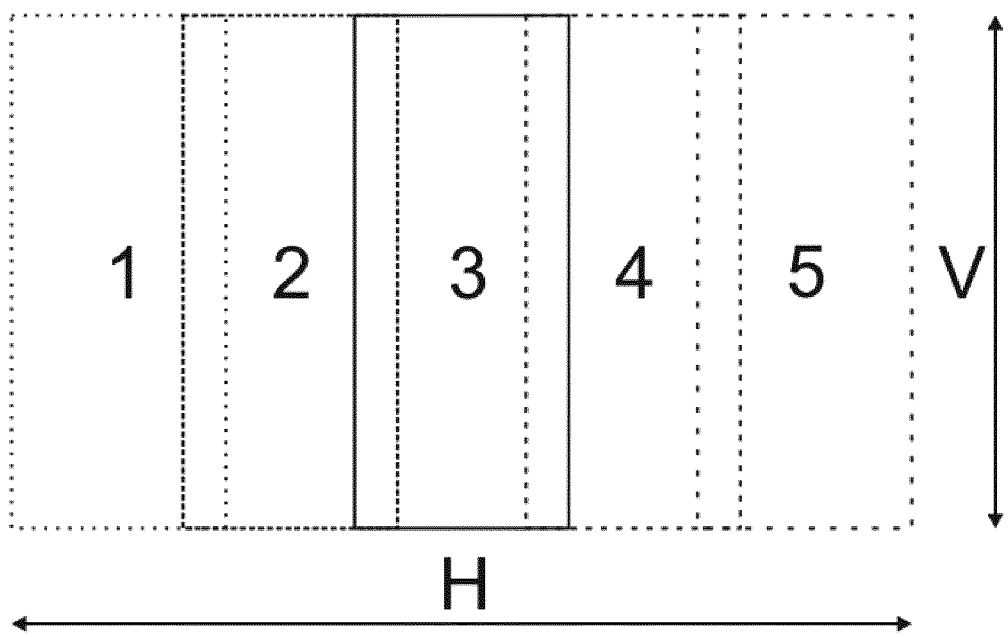
FIG. 25 shows five wave field segments which have a significant overlap in a general way according to the present invention.

FIG. 25 shows in comparison to FIG. 24 five wave field segments having a significant overlap in a general way. Such wave field segments might be used in a HMD or a HUD and can thus be equivalent to a segmentation of the field of view presented to an eye of an observer. As shown, each segmented wave field has a significant overlap with adjacent wave field segments. These five overlapping zones or regions shown can be equivalent to a field of view generated by using five wave field segments in a time-sequential way or by using spatial sampled segmentation. A horizontal field of view H is larger than a vertical field of view V. Such an illustration as shown in FIG. 25 might be a preferred layout of the field of view for a head mounted display device (HMD) or a head-up display device (HUD). The numbers 1 to 5 denote the different overlapping zones or region. The shown wave field segments in FIG. 25 are general wave field segments, which might be used in imaging applications or illumination applications, too. In general, these wave field segments might represent an image plane of an SLM imaged in space. In a HMD or HUD the five wave field segments represent five segments of a virtual image of the SLM having a significant mutual overlap. This general wave field segmentation based on a significant mutual overlap is advantageous in particular for holographic HMD or HUD providing three-dimensional (3D) objects or scenes in space as well as for stereoscopic HMD or HUD, which use segmented decoupling of wave fields and realize high definition viewing experience at the same time. This general layout of segmentation for a HMD or HUD can be extended to the two-dimensional case. This means that overlap based segmentation along two dimensions is used.

Figure 26:
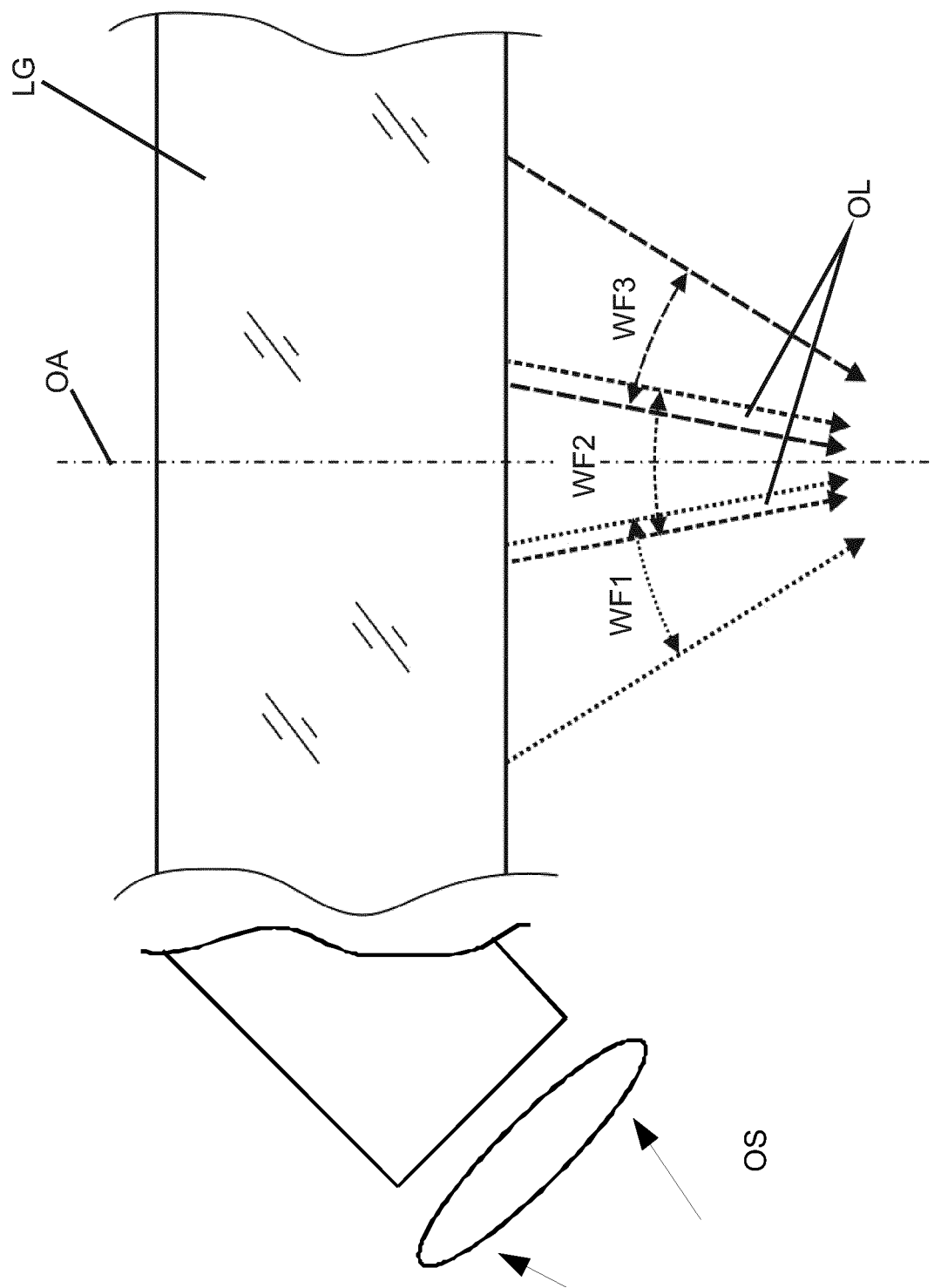
FIG. 26 shows a segmented decoupling of light out of a light guide in a general way.

FIG. 26 shows a segmented decoupling of light out of a light guiding element in a general way. Such an arrangement and decoupling of light can be used preferably in an HMD or an HUD. For example, it can be preferred to provide a self-illuminating SLM such as an SLM based on OLED (organic light-emitting diodes). Such an HMD usually comprises at least one light guiding element LG or wave guiding element and an optical system OS. The optical system OS is provided or arranged within the at least one light guiding element LG for the decoupling of light. The shown illustration is only a section of a light guiding element and shall illustrate the decoupling of light out of the light guiding element. Three wave field segments WF1, WF2 and WF3 are shown in FIG. 26. These three wave field segments WF1, WF2 and WF3 are decoupled out of the light guiding element LG and have a significant defined overlap OL to each other and with further adjacent wave field segments WFN if further wave field segments are provided or required. Here, the entire field of view is spanned by using the three wave field segments WF1, WF2 and WF3. The number of wave field segments used might be much larger, e.g. 7 or >20. The dot-dashed line denotes an optical axis OA, which might be an optical axis of an eye of a user of the HMD. FIG. 26 illustrates a schematic top view of a HMD using segmented decoupling of wave fields out of a light guiding element or wave guiding element. The segmented decoupling is based on a significant mutual overlap of adjacent wave field segments propagating to an entrance pupil of the eye of the user. As can be seen the three angular segments WF1, WF2 and WF3 have a required and defined mutual overlap OL. The required mutual overlap OL can be realized in a time-sequential way. This means that the wave field segments WF1, WF2 and WF3 are generated very quickly one after the other in such a way that the overlapping regions or zones or overlaps OL arise from the required direction of the wave field segments to the eye of the user by the optical system. In this way, the user does not see a gap between the individual wave field segments and can observe a reconstructed three-dimensional scene or object having a high image quality and high definition viewing experience.

Alternatively, a required defined mutual overlap can be provided in a way using spatial multiplex of decoupling geometries. This general layout can be extended in order to realize a two-dimensional case, that is, a two-dimensional light plane. For the two-dimensional case, this means that an overlap based segmentation and an overlap based segmented decoupling along two dimensions or two directions is used. The light guiding element is shown in FIG. 26 as a part of a transparent substrate only. At least at one surface of the light guiding element the optical system OS is provided which generates the wave field finally presented to the eye of the user. This e.g. means that a projection unit is provided at an entrance side of the light guiding element. This projection unit, which can be referred to as optical system or imaging optics or at least as a significant part of it, provides the wave field representing the two-dimensional or three-dimensional scene or object, which is finally detected by the user.

Of course, it is possible to increase the number of wave field segments decoupled out of the light guiding element used within the HMD, for example to five or seven wave field segments. The segmentation in a HMD or a HUD is carried out in the imaging beam path compared to the segmentation in the illumination beam path in a direct view display device or a projection display device.

The following description refers to general embodiments of the invention.

There are important boundary conditions to be fulfilled by a wave field used for a holographic imaging which is initially emitted by a primary light source. For example, a complex-valued SLM, which can modulate phase and amplitude with high spatial resolution, that is, e.g. at 33 μm addressing grid in the case of a direct view holographic two-dimensional encoded display device, can be used to generate sub-holograms. A sub-hologram generated in the plane of an SLM operates or acts as a small diffractive lens. In the case of a phase-only SLM the sub-hologram can be described by a so-called Fresnel zone plate. The focal length f of the small sub-hologram acting as diffractive lens defines the longitudinal distance or z-distance of an object point to be generated. For example, if a Fresnel lens provided in the SLM having a positive focal length f, which can be e.g.

$f_{SH}$=300 mm, is illuminated with a plane wave at a design wavelength, a focal point will be generated at a distance of z=300 mm in front of the SLM. This focal point is an object point generated in the three-dimensional (3D) space. This is only a simplified example.

For example, depending on the wavelength used an approx. 33 μm pixel pitch present in the SLM generates a diffraction angle between a zero diffraction order and one of the first diffraction orders in a range of 1 degree. However, this is not sufficient for a holographic display device. Therefore, a field lens should be used in front or behind the SLM of a holographic display device. This field lens has a focal length $f_{FL}$, which might be e.g. $f_{FL}$=600 mm in the case of a desktop-type holographic display device having a display diagonal of e.g. 811 mm (32"). Thus, the distance of an object point changes due to the lens equation which can be applied if thin lenses are used. This is described by:

$$1/f_{OP}=1/f_{SH}+1/f_{FL},\qquad(1)$$

where $f_{SH}$ is the focal length of a small diffractive lens-type sub-hologram, which can have a diameter of e.g. 5 mm only, $f_{FL}$ is the focal length of the field lens and $f_{OP}$ is the resulting focal length of two combined lenses, which can be the local sub-hologram lens and the global field lens. The sign OP is the object point, which can be generated at a distance $z_{OP}=f_{OP}$. For the exemplary given values of $f_{SH}$ and $f_{FL}$ an object point distance, for example, of $z_{OP}=f_{OP}$=200 mm can be obtained. In other words, the optical refraction power or optical diffraction power or optical focussing power of the field lens used globally can be added to the optical diffraction power of the sub-hologram used locally. If a positive power of the diffractive sub-hologram lens is provided, the field lens generates an effective focal length which is reduced. In this example the resulting real object point is placed approx. 200 mm in front of the SLM comprising the sub-hologram. The same applies to a negative focal length of the sub-hologram. If the objective of the sub-hologram is to generate an imaginary object point which is provided behind the SLM, a negative value of the focal length $f_{SH}$ has to be used. If a focal length of approx. 300 mm is used again, but with a negative sign, an imaginary object point is obtained placed approx. 600 mm behind the SLM. The focal power of the field lens concentrates the light formed from the sub-hologram to a divergent wave field. Therefore, equation (1) can be applied to positive and to negative focal power of the sub-hologram.

A further important boundary condition for illuminating a sub-hologram is the required limitation of the angular spectrum of plane waves. For example, the angular spectrum of plane waves that is used in order to illuminate the SLM plane comprising the sub-holograms should be kept significant smaller than ⅟60 degrees. Thus, visible smearing of object points generated in space can be avoided.

The segmentation of a plane to be illuminated and/or imaged can be provided in a time-sequential procedure. For example, such a procedure can use the scanning of a single group of wave field segments. Or, it can be performed at once, which can be realized by using tailored diffusion, homogenization or beam shaping. This can be referred to the embodiment shown in FIG. 15 and to the intensity distributions shown e.g. in FIGS. 17, 18 and 20.

In FIG. 23 the implementation of a tailored diffusion is shown. Thus, several mutual incoherent light beams can be used in parallel and the SLM can be illuminated at once. A different modulation of the light sources such as laser diodes used provides local dimming of the illumination of the SLM.

The temporal filling or providing of an illumination plane and/or imaging plane with wave field segments provides the capability of using a wide range of intensity profiles. This results in the fact that during the scanning or alternatively fixed angular or lateral switching of the light intensity modulation of the wave field segments can be applied, e.g. by modulating light sources such as laser diodes in a synchronized way, which can be used to homogenize the average intensity distribution obtained. This is referred to the intensity distribution shown in FIG. 21.

For example, fixed angular switching of light can be applied by using optical elements which provide an addressing of different fixed angles in an ON and OFF regime. For example, fixed lateral switching of light can be applied by using optical elements which provide an addressing of different laterally shifted beam paths in an ON and OFF regime. For angular switching of light e.g. liquid crystal (LC) dispersed Bragg diffraction based volume gratings can be used, which can be switched ON or OFF by applying a voltage of e.g. 40 V. This causes a change in the LC orientation and thus in the change of the modulation of the refractive index, which is equivalent to a change of the diffraction efficiency of the volume grating. This can be achieved with less than 1% scatter loss.

A preferred intensity distribution depends on the discrete embodiment, that is, on the discrete shape of the wave field segments used in a time-sequential or in a quasi-static mode.

For a time-sequential segmentation of wave fields a wider range of intensity distributions can be used because of the additional parameter of intensity modulation which can be applied to the discrete position addressed during the scanning operation. In other words, scanning by using a smaller beam diameter can provide a high resolution of local dimming. However, an overlap region or zone should be provided in a temporal or spatial procedure. The overlap region or zone should be sufficiently large in order to provide high definition (HD) viewing experience. In other words, during the scanning procedure of a wave segment illuminating an e.g. complex-valued SLM, the intensity transition zone, which goes from $I_{max}$=1 to $I_{min}$=0 should be approx. as large as the entrance pupil of a human eye, which is approximately 3 mm only. This boundary condition applies to static scanning based illumination approaches (several wave field segments at once) and for dynamic scanning based illumination approaches. Although scanning can be used to increase the dynamic intensity range (or the bit depth) of the illumination, the overlap criterion has to be fulfilled.

By way of example, a direct view holographic display device placed at an observer distance of z=3 m might generate an object point 1.5 m in front of the display device. The mean brightness detected by the observer is 100 cd/m², thus resulting in a diameter of the entrance pupil of 2.9 mm only. This means that a use of a circular shaped sub-hologram is sufficient, which has a diameter of 2.9 mm only. Within the circular area of the sub-hologram used a transition zone of the intensity distribution of the wave field segment has to be present, which goes from $I_{max}$=1 to $I_{min}$=0. This gradient of the intensity distribution is practical. Larger gradients increase the resulting point spread function, which represents the image formation, in a way that high definition viewing experience cannot be obtained anymore. This is also disclosed with reference to the FIGS. 1, 2 and 3.

The preferred intensity distribution has a maximum value in the center of the wave field segment and a value of 0 (zero) at the rim of the wave field segment. Furthermore, it is preferred that along the direction from the center of the wave field segment to its rim the intensity distribution is continuous. This means that it is preferred to avoid steps in the intensity distribution.

An exemplary embodiment is described:

The—in general complex-valued—profiles of the wave field segments used for illumination applications and/or imaging applications are dependent on the discrete embodiment, thus the shape of the wave field segments and the arrangement of overlapping the wave field segments. Thus, phase distribution and amplitude distribution can be optimized regarding the discrete application and the discrete embodiment.

A practical approach for the phase distribution that can be provided for the wave field segments to be combined is the use of a constant phase distribution or a phase distribution that is continuous and has only reasonable small gradients, that is, to avoid phase steps as e.g. $\Delta\varphi > \pi/4$. Smaller steps within the phase profile might also be efficient or practical. Without loss of generality it can be assumed constant phase distributions and mutually incoherent wave field segments.

The intensity distribution should provide a constant sum or at least a slightly varying sum of the wave field segments to be combined. For example, rectangular or square shaped wave field segments can be combined complying with the overlap condition, as it is shown e.g. in FIG. 6 or 7. It can be seen that there are one-dimensional sections as e.g. parallel to the x-axis and y-axis of the intensity distribution shown in FIG. 11, which are similar to one-dimensional sections shown e.g. in FIG. 4.

Regarding two-dimensional distributions, it depends on the shape of the wave field segments and the method of putting together the individual wave field segments. The special pyramidal distribution shown in FIGS. 9 and 10 is an example for this. Here, it is preferred if a maximum value of the distribution is provided in the center of the wave field segment, which is e.g. a value of 1 (one), and an intensity value of 0 (zero) is provided at the rim of the wave field segment, and if the function of the distribution is continuous, i.e. no steps are present.

As can be seen in FIG. 9 several functions such as a Gauss function tailored in its sigma value, i.e. to be tailored by changing the value of the full width half maximum extension, might be used in a procedure to be close to an ideal one which results in a constant total intensity of the wave field segments combined. In other words, instead of using an ideal intensity distribution as shown in FIG. 9, for example, a tailored Gauss function might be used as practical approximation. A plurality of tailored circular distributions might be used which show axial symmetric distribution. Such circular distributions might also be changed in order to be closer to a rectangular footprint, a square footprint or a hexagonal footprint. This means that the axial symmetry of the wave field segments used within the superposition, which takes place in the entrance plane of the SLM illuminated with these wave field segments, might be changed. In other words, the shape of the wave field segment can be tailored to the requirements.

An adaptation of e.g. a Gauss function to the function shown e.g. in FIG. 9 can also be carried out along different directions by using different parameters. This means that the sigma value of the Gauss function differs for different directions. For example, for square wave field segments the sigma value of the tailored Gauss function $\sigma(0$ degree$)$ might be the same as $\sigma(90$ degrees$)$ but might be different to $\sigma(45$ degrees$)$. Here, $\sigma(0$ degree$)$ is the direction parallel to the x-axis, and $\sigma(90$ degrees$)$ is the direction parallel to the y-axis. This also applies to other functions that might be chosen as e.g. a cosine-like function, which can be tailored and optimized like this in order to obtain a sufficiently constant total intensity distribution. Hence, local but fixed variations of e.g. 10% can be compensated easily. For this purpose, a calibration can be used in combination with a look-up table (LUT).

Compared to rectangular wave field segments hexagonal wave field segments as shown in FIG. 7 require a different intensity profile in order to provide a constant and homogeneous total intensity. An ideal intensity distribution of the wave field segments depends on the footprint (or shape) of the wave field segments and the grid used for putting together all wave field segments to a combined wave field. A general procedure can be used in order to generate the intensity distribution required.

An initial intensity distribution $I_k(x,y)$ can be chosen, that can be referred to as start intensity distribution. Here, k is the index of the iteration, which may be e.g. 1 or 2 ($k \in \mathbb{N}$). This intensity distribution $I_k(x,y)$ might follow the general procedure of using a bright center and an apodization decreasing to a value of 0 (zero) at the rim of the wave field segment. A standard distribution can use a linearly falling intensity distribution.

Then, the wave field segments having the initial or start intensity distribution $I_k(x,y)$ can be summed up in order to form an initial total intensity distribution $\Sigma_{ij}(I_k(x,y))$. The total intensity distribution for the first iteration step is $\Sigma_{ij}(I_1(x,y))$. The total intensity distribution for the $k^{th}$ iteration step is $\Sigma_{ij}(I_k(x,y))$. The indices i and j are the individual wave field segments summed up in order to fill or complete a plane used for illumination applications as e.g. a backlight unit (BLU) of a holographic display device or to fill or complete a plane used for imaging applications as e.g. in an HMD or a holographic HMD while complying with the overlap condition at the same time. Here, $i,j \in \mathbb{N}$. The indices i and j can be used similar to address a matrix or a set of matrices which are laterally shifted to each other. The indices i and j are the wave field segments that have to be summed up and that have to result in a homogeneous total intensity distribution.

For the sake of simplicity, it might be assumed a constant phase distributions $\varphi_{ij}(x,y)$=constant for all wave field segments identified by the indices i and j. The difference to the constant intensity distribution that should be provided or even to an arbitrary intensity distribution that should be generated as the sum of the wave field segments can be calculated. The intended design or target intensity distribution can be referred to as $\Sigma_{ij}(I_T(x,y))$. The sum is generated by using all wave field segments denoted by the indices i and j. This is similar to adding elements of a matrix identified by the indices i and j. The deviation of the intensity sum $\Sigma_{ij}(I_k(x,y))$ obtained in the $k^{th}$ iteration to the target intensity distribution $\Sigma_{ij}(I_T(x,y))$ is given by:

$$\Delta\Sigma_{kT} = \Sigma_{ij}(I_k(x,y)) - \Sigma_{ij}(I_T(x,y)). \quad (2)$$

This difference that is the deviation between the two intensity distributions can be used in order to form the correction value intensity distribution. This correction value-type intensity distribution is used as an additional offset to be added to the initial intensity distribution. In other words, this delta-type distribution shows where in areas too high intensity is present and where in areas too low intensity is present. The values, which are too high, have to be subtracted and the values, which are too low, have to be added. This means that the initial intensity distribution of the individual wave field segments might be increased in areas generating intensity peaks and might be reduced in areas generating too low intensity values. Thus, the final intensity distribution is obtained. This points out that there is only a short iteration, that is, only one difference distribution is used.

For example, the index t can be used to mark the number of locally overlapped wave field segments. For the arrangement shown in FIG. 6 using rectangular or square shaped wave field segments t has a value of 4. And for the arrangement shown in FIG. 7 using hexagonally shaped wave field segments t has a value of 3.

The difference $\Delta\Sigma_{kT}$ given by the equation (2) can be divided by t, for example the difference $\Delta\Sigma_{kT}$ can be divided by four in the case of using rectangular wave field segments as shown in FIG. 6. The obtained intensity distribution can be subtracted from the initial intensity distribution to obtain the corrected profile:

$$I_{k+1}(x,y)=I_k(x,y)-\Delta\Sigma_{kT}/t. \qquad (3)$$

The discrete procedure depends on the discrete application and the level of correction which should be obtained finally. For a holographic three-dimensional display device intensity variations of e.g. ±5% might be acceptable. The variation can be calibrated and corrected by e.g. using a look-up table (LUT) for the encoding of sub-holograms considering the small intensity variations, which might be still present. This applies to illumination applications as well as to imaging applications. This means that the optimization of intensity profiles or intensity distributions can be carried out for the plane illuminating an SLM or for the field of view (FOV) presented to an observer within an apparatus such as a holographic HMD.

For the correction of the intensity profile or intensity distribution of the wave field segments it may be sufficient to consider the area only relating to a single wave field segment. The entire intensity distribution might be corrected at once. For the case of using a target intensity distribution $I_T(x,y)$ that is constant in the entire plane to be optimized, i.e. $I_T(x,y)$ has, for example, a value of 1 within the entire plane, it might be sufficient to optimize only one single wave field segment of the wave field arrangement to be summed up. This optimized intensity distribution, which might be complex-valued but which is e.g. an intensity distribution combined with a constant phase, can be used for all wave field segments to be combined with each other. In the case of providing a reasonable larger number of wave field segments and a target intensity distribution $I_T(x,y)$ that only varies slightly along the plane to be optimized a single optimized intensity profile or optimized intensity distribution might be utilized for the wave field segment. The wave field segment can be corrected completely by using a correction factor multiplied by each wave field segment present in the plane to be optimized. In the case of providing a small number of wave field segments and a target intensity distribution $I_T(x,y)$ that shows strong local variations along the plane to be optimized the entire plane should be optimized. This means that individually optimized intensity profiles or intensity distribution might be obtained for each wave field segment present in the plane to be optimized. The optimization can be carried out as already described above.

For example, the optimization of hexagonally shaped wave field segments as e.g. shown in FIG. 7 can be carried out as described above in order to provide a constant and homogeneous total intensity distribution or even arbitrary intensity distributions which are generally complex-valued. In general, intensity profiles or intensity distributions can be optimized by using symmetry operations. This means that only the intensity profile or intensity distribution being present within a part of the wave field segment is optimized and duplicated or multiplicated afterwards in order to fill or provide the entire wave field segments with that optimized intensity distributions. For this it is referred to the intensity distribution shown in FIG. 8. One quadrant, e.g. Q1 (not shown), can be optimized and transferred afterwards to the other three quadrants Q2, Q3 and Q4 (not shown) by rotating the intensity profile or intensity distribution obtained for the quadrant Q1 around the rotation axis, which lies in the center of the wave field segment, i.e. at $x_{tile}=0$ and $y_{tile}=0$ that are center points of the wave field segments local coordinate system.

If the wave field segments are arranged as shown at the left hand side of FIG. 7, the hexagonally shaped pyramidal-like intensity distribution having a maximum value in the center, which decreases linearly to the value of 0 (zero) at the rim of the wave field segment, has a total intensity distribution having a variation of less than 5% compared to a mean intensity value even if small lateral deviations from the ideal hexagonal grid spacing are introduced. Exact intensity distributions and exact lateral placement of the wave field segments will result in an exact constant intensity distribution. Hence, for a plurality of applications this type of wave field segment can be preferably used. This means that it may not be required to start with other intensity distributions which have to be further optimized by applying the procedure disclosed and described. This shows that a hexagonal grid spacing of the segmentation leads to reduced complexity of the intensity profile or intensity distribution to be used for the wave field segments. This also implies that a hexagonal grid type of interlacing the wave field segments might be preferred for a plurality of applications. The use of a hexagonal grid type for the positioning of wave field segments to be combined in a nested way might also be provided in the case of using intensity distributions that are closer to e.g. Gauss functions than to hexagonal pyramid function. This means that a hexagonal placement of the wave field segments can also be applied, for example, to wave field segments having a circular footprint (or shape) instead of a hexagonal footprint (or shape).

As already disclosed, FIG. 14 shows the total intensity distribution of nested hexagonally shaped wave field segments. The intensity distribution of the six wave field segments of each hexagonal wave field segment decreases from the center to the rim of the wave field segment in a linear way. This pattern shown is obtained by using the arrangement of nested hexagonally shaped wave field segments as shown in FIG. 11. Slightly lateral deviation from the ideal hexagonal grid is introduced. The deviation from the mean intensity value of 1 (one) is within a range of ±5%. Only a small intensity variation is present even if slightly lateral deviations from the ideal hexagonal grid used for the placement of the wave field segments are introduced, e.g. due to slight misalignment.

Close to linear transition zones between the wave field segments might be preferred. Thus, enlarged Gauss-type or cosine-type intensity distributions are preferred and might be practical. It is possible to provide an intensity distribution having a mean intensity value of $I_0$ and a deviation to this of e.g. up to ±5% or even up to ±10% present within the plane illuminating the SLM. Such an intensity distribution or even intensity distributions with even larger variations can be calibrated in order to generate correction data stored in a look-up table (LUT) and used for the encoding of sub-holograms into the SLM.

The following explanations refer mostly to scanning illumination and local dimming of light:

Local dimming of light can be used to increase the overall image contrast of three-dimensional scenes or objects detected by an observer. More specific, local dimming increases the dynamic range which can be presented to an eye of an observer.

It is an intention to use local dimming within high brightness and high dynamic range (HDR) display devices. For this purpose laser based embodiments can be used. The resulting motivation for spectral conversion is based on the reduction of the coherence properties of the light emitted by an illumination device of the display device. Completely incoherent light can be presented to an observer by using the disclosed spectral conversion approach.

An advantageous feature of the spectral conversion, which can be used in particular for two-dimensional (2D) display devices, stereo 2D display devices, projection display devices or stereo projection display devices, is the ability for the realization of significant higher frame rates and/or significant power saving, which is especially important for mobile devices.

For example, the high refractive liquid crystal (LC) E44 from the company Merck has an ordinary refractive index $n\_o=1.5225$ and an extra ordinary refractive index $n\_e=1.772$ for the red wavelength 650 nm, which can be used in order to provide a wide color gamut. Thus, a modulation of the transmission between 0 and 1 can be provided by using a cell thickness of $d=1.31$ μm. For the wavelength of 405 nm E44 has an ordinary refractive index $n\_o=1.5598$ and an extra ordinary refractive index $n\_e=1.9023$. Thus, a modulation of the transmission between 0 and 1 can be provided by using a cell thickness that is slightly less than $d=0.6$ μm. The factor $1.31^2/0.6^2=4.77$ defines the factor that can be obtained as increased frame rate. This factor close to 5 can also be provided to reduce the loss of energy of the display panel without changing the initial frame rate. This shows that it is very attractive to use spectral conversion for standard-type two-dimensional display devices such as televisions, too.

The use of even shorter wavelengths depends on the overall spectral transmission of the optical components used in the display device and on the long term chemical stability of the liquid crystals (LC) while exposed e.g. to ultraviolet (UV) light.

The document to DE 102007049029 A1 discloses a spectral conversion that uses a tailored characteristic of spectral filters. This approach can be further developed to an embodiment that uses spectral conversion for display applications according to the present invention. Such an arrangement or procedure is described and explained in the following sections. An entrance plane of the arrangement or device regardless of whether a front light unit or a backlight unit is used comprises an anti-reflection coating, which provides a maximum transmission for the wavelength used for the excitation of the dye or the quantum dot (QD) material. A first surface in the device, which provides high transmission for the excitation wavelength, can be provided in front or behind the plane of the SLM, which can be formed, e.g., by using LC material. A second surface is provided, which reflects the exciting wavelength back. Hence, the path length is doubled, where the path length is present within the spectral conversion material. At the same time, a dielectric multi-layer coating orientated to a user space shows a high transmission for the generated wavelength. Structuring of the QD-material and the dielectric layer-type filters can be used additionally.

In other words, doubling the path length of the exciting wave length and allowing emission of the generated wave lengths only to the user space can be obtained by using special designed dielectric filter stacks. These dielectric layer-type filter stacks can be manufactured by using standard coating technologies.

In cases of providing very small pixels regarding the height of the spectral conversion material used the spectral conversion material can be embedded within a two-dimensional grid, which avoids crosstalk and spatial smearing of the spectral converted signal generated.

A spatial separation of different colors, which are used to excite the specific spectral emission of the QD-material, e.g. within a local dimming approach, can be obtained by using a combination of gratings and a micro lens array. This means that e.g. different UV wavelengths will illuminate different parts of a patterned QD-matrix. The QD-matrix can comprise e.g. three QD-materials with different spectral emission. Different spectral absorption can also be obtained.

In general, the spectral and the angular characteristics of the diffraction efficiency of multiplexed volume gratings such as Bragg diffraction based volume gratings can be used in order to obtain a patterned spatial separation of different, spectrally or angularly separated components, i.e. light beams or wave segments.

Thus, a single light source such as an UV laser can be used to provide three local dimming wave fields, which enter a multiplexed volume grating geometry at different angles. For example, it is possible to provide a first scanning unit, which uses a wedge-type backlight unit (BLU) and which scans from the bottom line of the SLM or display device. Additionally, a second scanning unit can be provided, which also uses a wedge-type backlight unit but scans from the top of the SLM or display device. Furthermore, a third scanning unit can be provided, which uses a wedge-type backlight unit, too, but e.g. scans from the left hand side of the SLM or display device. All three scanning units might use the same primary light source such as a UV laser, i.e. the same UV wavelength.

In addition to the use of the spectral and/or the angular characteristics of the diffraction efficiency of the multiplexed volume gratings such as multiplexed Bragg diffraction based volume gratings the polarization selectivity of a volume grating can also be considered. Thus, different scan geometries can be multiplexed by using a separation that is based on the separation of orthogonal polarization states of the light used for the scanning based local dimming.

However, it is also possible to provide polarization elements such as polarization filters or polarization gratings in order to locally block a polarization state of the light. Hence, the use of polarization gratings, e.g. polymerized polarization gratings, can also be considered in order to provide the capability of color filter replacement.

Examples and embodiments of local dimming and scanning illumination:

Local dimming can be used to increase the dynamic range, which can be recognized by an observer of a three-dimensional scene or object. Hence, an illumination device has to be realized that is able to provide local addressing of segments of the backlight unit in order to illuminate areas of the SLM temporally and/or spatially. Such an illumination device might be used for scanning illumination, local dimming or both procedures.

A device showing the basic principle, which can be chosen in order to implement local dimming and/or scanning operation of an illumination device, is shown e.g. in FIG. 15.

The implementation of partial illumination is provided in front of the two times factor 10× anamorphic beam stretching arrangement. The two light beams B1 and B2, which have a defined angular difference, are reflected by the scanning mirror element SM. The distance of the scanning mirror element SM and the collimation unit CL is equivalent to the focal length of the collimation unit CL. The light emerging from the front focal point of the collimation unit CL is collimated behind this collimation unit CL. Thus, the light beams B1 and B2 are parallel to each other. The intensity distribution I(t,x,y, RGB) can be defined as required for the local dimming of light. As already disclosed, t is the time, x and y are the coordinates of the exit plane of the collimation unit CL and RGB denotes the different colors used.

A two-dimensional scanning of a beam bundle such as a fan-out laser bundle is efficient and practical and can be implemented with reasonable low costs. A slight overlap of the intensity distributions illuminating the SLM can reduce the risk to see gaps if mechanical stress is applied to the apparatus such as a holographic display device.

MEMS or acousto-optical modulators (AOM), for example, can be illuminated with several light beams or wave fields having slight angular differences. Thus, a plurality of light beams such as laser beams can be scanned in parallel. This means that the scanning unit must not span the entire angular range of the area, e.g. the 16:9 shaped exit plane of the collimation unit. It is sufficient to scan along a portion, which might be e.g. only ¼ or even much less.

The more light beams are used in parallel, the more temporally modulated light beams have to be provided in parallel in order to illuminate the scanning unit as angular spaced bundle of rays. These different bundles of rays require an individual intensity modulation. They can be initially generated by splitting the light beam of a primary light source into a number of light beams required.

The use of a single primary light source such as a laser for each primary wavelength ensures to have a bundle of rays for each color that has the same wavelength. For example, the use of a set of blue light sources bears the risk of wavelength mismatch, which can also be dynamic due to temporal change. If a plurality of different primary light sources is used, a maximum of the spectral shift of $\Delta\lambda \leq 0.1$ nm has to be ensured. However, it is preferred to provide a single primary light source for each primary color.

A homogeneous illumination of the SLM is equivalent to realize a flat-top rectangular intensity distribution present at the exit plane of the collimation unit. A practical intensity distribution of the single light beams or wave fields might be close to a frustum of pyramid. The overlapping regions or zones are designed in such a way that a sum value of 1 can be achieved if the overlapping regions or zones are superimposed with the neighboured overlapping region or zones.

In order to keep diffraction effects within a practical range, the diameter of the single light beams, which form the bundle of rays scanned along two directions, should be limited. Beam diameters as e.g. used in FIGS. 18 and 20 are practical. The reduction of these beam diameters much further, e.g. by using a factor of ×0.2, is not practical. Discrete values are dependent on the discrete embodiments used.

A practical arrangement of a segmented illumination providing local dimming can be realized by using a single two-dimensional scanning MEMS mirror element. The MEMS mirror element can be arranged in the front focal plane of a collimation unit. A light beam, which e.g. has a Gauss intensity profile or distribution, can be two-dimensional scanned in order to temporally fill the required part of the aperture of the collimation unit, which can be, for example, a square area having an aspect ratio of 16:9.

If e.g. a frame rate of 360 Hz and a time-sequential RBG operation is provided, one frame of the dimming-type operation or scanning-type operation is ⅟₃₆₀ s only. In addition, only a part of a single frame is used to illuminate the SLM. This means for example that it is only provided ⅟₁₀₀₀ s to provide the feature required. This means further that a kHz operation frequency and a parallel operation have to be provided.

For example, a fast scanning mirror uses a flat coil, which is orientated parallel to the mirror and which is integrated within the mirror structure, on top of a high field strength mirror. This magnetic actuator principle is faster than an electro-static approach. Due to a magnet used, more volume is required, e.g. a few mm³ more.

A much faster scanning can be obtained by using acoustic optical modulators (AOM), which have a piezo-electric transducer (PZT) attached at one side of e.g. a transparent substrate such as a quartz plate or a sapphire plate and which generates a moving of a grating such as a Bragg grating.

It is not preferred to provide a pixel-type SLM at the exit of a collimation unit, i.e. in front of a beam stretching such as based on a volume grating wedge-type anamorphic beam stretching, due to diffraction effects present at the apertures. If an amplitude modulation is implemented within the exit plane of a collimation unit, a smooth distribution is preferred. This e.g. can be realized by using an optical addressed SLM (OASLM). In other words, a smooth intensity distribution can be obtained by using an optically addressed SLM, which provides local dimmed zones. A fourth wavelength can be used to be scanned along an optical addressed SLM and blocked further along the beam path. The fourth wavelength is not used as an imaging wavelength. It is only used in order to optically address the OASLM. Thus, e.g. a near infra-red wavelength might be used for this.

A reduced number of active elements in the apparatus such as a holographic display device reduces the costs of manufacturing the apparatus. Therefore, a scanning with a single MEMS mirror element, which is illuminated by using a plurality of temporal modulated light beams, could be the most practical procedure.

Further beam shaping elements can be provided to change the Gauss-type beam profile or distribution e.g. into a flat-top distribution or into a frustum of pyramid distribution if required. In general, beam shaping that includes phase distribution and amplitude distribution can be implemented in the apparatus in such a way that the complex-valued profile or distribution finally obtained can be optimized within the entrance plane of the SLM to be illuminated in a locally dimmed scheme.

A plurality of modulators such as MEMS based modulators, fiber based modulators, AOM based modulators or even LC based modulators can be used in order to provide the temporal modulation of the single light beams forming the two-dimensional scanned bundle of rays. This also includes optical fiber based modulators, e.g. Mach-Zehnder-type modulator, which can provide amplitude modulation and phase modulation in the kHz range.

A further procedure can be used to provide holographic encoding in combination with, e.g., a phase SLM or a complex-valued SLM or an SLM sandwich. Thus, in front of the beam expansion in the apparatus the intensity distribution that corresponds to a required intensity profile or distribution of the local dimmed frame can be provided.

For example, a complex-valued SLM, which works e.g. in transmission or in reflection, can be arranged in front of a lens, which is e.g. a plane convex lens. A Fourier plane, which is the back focal plane of this lens, comprises a zone spanned between the 0$^{th}$ diffraction order and further diffraction orders. This zone can be cut out to block disturbing light. Arbitrary intensity profiles or distributions can be encoded in this zone, e.g., by using iterative Fourier transformation algorithm (IFTA), which is fast enough for real time encoding of this local dimming intensity profile or distribution. It is also possible to use pre-calculation, a look-up table having values for the distribution or "take the values that are delivered from a holographic video as local dimming-type meta data" for encoding of the local dimming intensity distribution.

Instead of using the Fourier plane for encoding the local dimming intensity distribution, a plane can be used that is much closer to the plane of the SLM, where object points can be encoded that are placed in one plane. The encoding can also generate object points in different planes in order to compensate for the depth change, which is due to the anamorphic beam stretching. In other words, the encoding has to consider the entire design of the apparatus such as a display device.

In FIG. 16 a grating based implementation of partial illumination providing scanning and modulation is shown. A further procedure may be the use of phase gratings or polarization gratings, which can generate arbitrary diffraction functionality at least along one dimension. An active-type phase grating can be provided in order to span a sufficient angular range of the light. Thus, a defined angular spectrum of plane waves can be generated, which can be used for scanning illumination or for stripe-type local dimming. A further grating or a second grating might be provided in a crossed configuration with the one grating or the first grating in order to address the second angular orientation of the light. A phase grating can generate different diffraction orders of a single grating period or it can represent a superposition of different grating periods, too. Thus, a wide freedom of design can be provided if realizing a two-dimensional local dimming with active-type phase gratings.

Corresponding to the use of a single scanning mirror element, active-type gratings can also be illuminated with a bundle of rays, which have angular differences in one or two dimensions or directions.

It is preferred to use a bundle of light beams such as laser beams, which do not show mutual coherence. To obtain this, coherence preparation can be provided. One solution for that may be the use of a delay line for the bundle of rays used. This and the use of e.g. two crossed step/stair-type embodiments, which work in refraction or reflection, have already been described. An embodiment, which provides this at reasonable low costs, can provide the splitting of a primary light source into a number of beams required by providing a bundle of optical fibers, e.g. 3×4=12 optical fibers. The individual optical fibers shall introduce optical path lengths, which differ from optical fiber to optical fiber. The optical path difference should be larger than the coherence length of the primary light source used, which is e.g. 10 mm. Polarization recycling allows to use optical fibers here, which do not maintain the polarization.

However, free space propagation based embodiments can also be realized in a compact form, which combine coherence preparation and the modulation of the bundles or rays. One way to realize coherence preparation is to use spectral conversion.

Regarding the use of a laser as a light source for a two-dimensional imaging, it is advantageous to implement spectral conversion for generating incoherent illumination. This provides the elimination of speckle pattern, which might be recognized by an observer looking at the content of a scene or object shown. Instead of scanning and directing e.g. an electron beam onto an RGB emitting structured phosphor mask within a cathode ray tube (CRT), light beams such as laser beams can be scanned and directed onto a plane providing spectral conversion. Several embodiments can be realized.

The most simple and direct procedure may be the use of a light source having a short wavelength, for example a wavelength of 405 nm, 365 nm, 355 nm or less. For example, lasers working at these wavelengths are available at reasonable low costs. The use of much shorter wavelength is not recommended because of absorption loss, which can be present within the optical components used. The use of infrared (IR) wavelengths for the scanning and the conversion down to the visible spectrum, e.g. by using a two photon process, is not energy efficient enough.

A conversion plane can be formed as a non-structured or structured plane. The structured spectral conversion plane can be formed equivalently to a color filter pattern, which is placed at an entrance plane of the SLM to be illuminated. It is preferred to use quantum dots (QD's) instead of classic fluorescent materials. This is based on the fact that quantum dots can provide a spectral width that is e.g. 15 nm at full width at half maximum (FWHM) only. A procedure requiring low technological effort only may be the providing of a non-structured spectral conversion layer and a structured color filter for the SLM to be illuminated.

Figure 27:
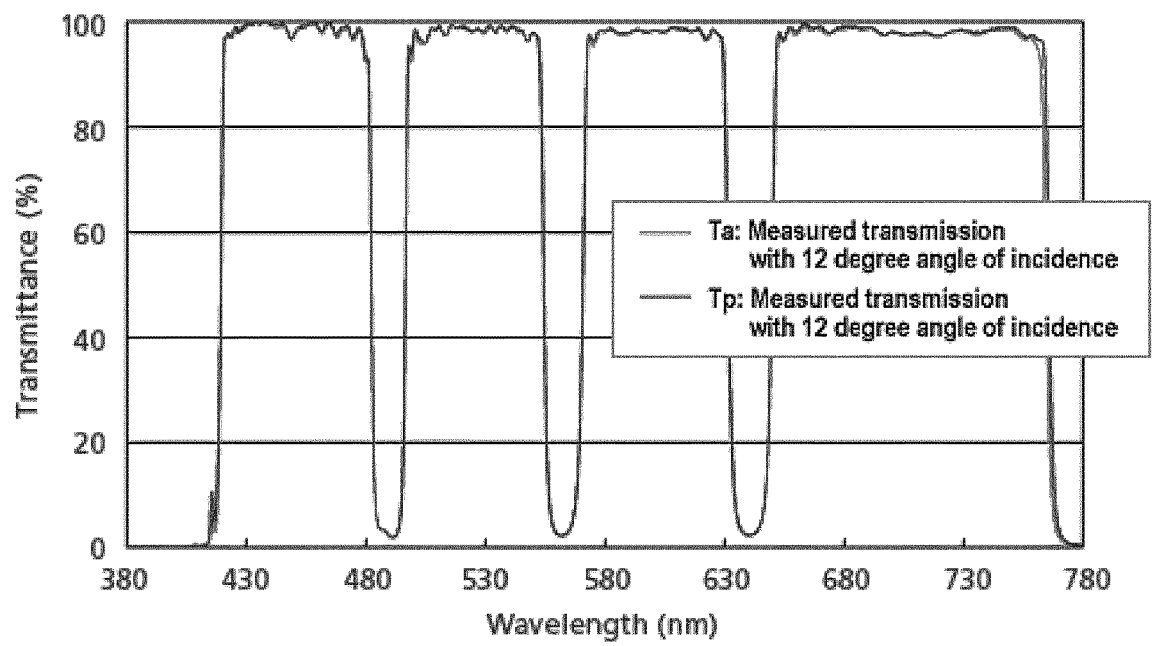
FIG. 27 shows a spectral transmission of a triple notch filter.

A triple notch filter coating can be used to provide defined spectral transmission for the three primary colors only. FIG. 27 shows a spectral transmission of a triple notch filter. FIG. 27 points out that a spectral range not transmitted through the triple notch filter can also be used for a spectral conversion. For example, a wave length of 405 nm can be used to excite quantum dots optimized for an emission of 450 nm. A wavelength of 490 nm can be used to excite quantum dots optimized for an emission of 520 nm. And, a wavelength of 570 nm can be used to excite quantum dots optimized for an emission of 647 nm wavelength. This means that spectral lines in the visible spectrum can be used that are converted into other spectral lines in the visible spectrum.

A development using quantum dots is a tailored spectrum of absorption and emission. This means that only small spectral bandwidth is able to generate a small spectral emission. Thus, three different wavelengths can be used in order to generate three different colors, which are emitted selectively. Hence, an optional embodiment is a scanning unit comprising three spectral separated scanning parts. The combining of three spectral separated wave fields can be carried out by providing a set of dichroitic filter plates or an X-cube, which comprises tailored coatings.

Figure 28:
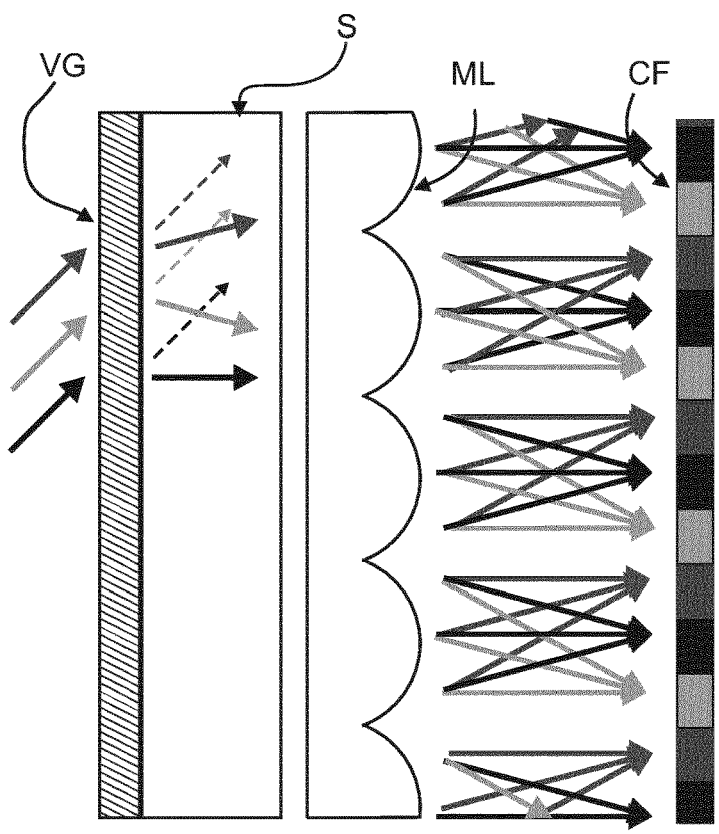
FIG. 28 shows a spatial separation of different spectral components obtained by a combination of diffractive gratings and a micro lens array.

A spatial separation of different colors can be obtained by providing a combination of gratings and a micro lens array. This is shown schematically in FIG. 28. FIG. 28 illustrates how a combination of a volume grating VG such as a multiplexed Bragg diffraction based volume grating and a micro lens array ML, which has the pitch of the combined RGB pixels of the SLM, can be utilized in order to obtain a spatial separation of different spectral components. The volume grating VG is provided on a transparent substrate S. The transparent substrate S comprising the volume grating VG follows the micro lens array ML in the beam path. And, the micro lens array ML follows a color filter array CF. As can be seen in FIG. 28 the volume grating VG effects different deflection angles for the individual color beams RGB and directs these color beams RGB on the individual lenses of the micro lens array ML. The lenses of the micro lens array ML focus the individual color beams RGB on the corresponding part of the color filter array CF, i.e. on the corresponding color filter (red filter, green filter, blue filter) of the color filter array CF.

Although FIG. 28 shows how a spectrally allocated illumination of a color filter array CF can be provided, which is arranged, e.g., in an entrance plane of the SLM to be illuminated, this embodiment can also be used to illuminate a structured quantum dot array.

A volume grating VG can also have a focussing function. A refractive micro lens array can be replaced by a diffractive micro lens array, which is e.g. a Bragg diffraction based volume grating. However, the alignment of a micro lens array might be preferred because of the established technology.

A higher frame rate can be obtained by using e.g. three short wavelengths only. This is a general procedure for an SLM that is not limited to high dynamic range providing local dimming, which e.g. might be based on scanning illumination. In other words, this can accelerate the frame rate of time being two-dimensional (2D) or two-dimensional (2D) stereo display devices significantly.

For example, a wavelength of 405 nm can be used to illuminate the SLM by using edge lit configuration or even a local dimming procedure. If a liquid crystal (LC) is assumed having an index of ordinary refraction $n\_o=1.5225$ and of extraordinary refraction $n\_e=1.772$ at $\lambda=650$ nm, which can be used for a wide color gamut providing red primary color, the difference between the indices is $\Delta n = n\_e - n\_o = 0.2495$. Thus, the modulation with a phase difference of $\pi$ requires a thickness of 1.3 µm. For a wavelength of 405 nm the dispersion formula is $\Delta n = n\_e - n\_o = 1.9023 - 1.5598 = 0.3425$. Thus, for a wavelength of 405 nm the modulation of $\pi$ requires a thickness of the liquid crystal of 0.561 µm only. Compared to a wavelength of 650 nm, this is a factor of 2.3. If e.g. an ECB (Electronic Code Book) mode is used for the modulation of the liquid crystal, this would result in a factor of 5.3, which can be obtained in order to increase the frame rate. It is also possible to keep the initial frame rate fixed and decrease the voltage by a factor of 5.3. This can also be an important advantage in order to reduce the loss of electrical power within the SLM itself. However, this procedure can also be used for a higher frame rate and a lower voltage at the same time. For example, the frame rate can be increased by a factor of >2. And, at the same time the voltage can be reduced by a factor of >2.

A wide parameter range can be adapted to the spectral conversion. This especially applies to local dimmed illumination using coherent light sources.

A scanning providing local dimming can also be modified in order to realize a non-scanning imaging. This means that, e.g., a single beam scanning, a scanning using a set of beams, a line scan or an imaging of an intensity distribution onto an entrance plane of the image SLM to be illuminated with a locally dimmed intensity distribution can be implemented. A plurality of projector designs can be adapted in order to realize local dimming with a non-scanning operation, as can be see e.g. in FIG. 23. A single primary light source can be split into m×n secondary light sources or extended light sources to be modulated individually. Or, a set of light sources, a light source array, a light source-type self-emitting display device, an SLM, DMD or and LCoS-type SLM (Liquid Crystal on Silicon) can be used. It is also possible to use light source arrays and implement a scanning of these light source arrays, in other words to use a temporal tiling of a light source SLM.

Although anamorphic beam stretching, which is based on diffractive optics, can provide a compact collimated illumination with an angular spectrum of plane waves, e.g., at less than 1/120 degrees or even a single plane, curved or arbitrary shaped wave, one volume grating of a wedge based backlight unit comprising at least two volume gratings can be replaced by using an aspherical mirror element or a reflective free form surface. This could not be as compact as the two volume grating based collimated wedge based backlight unit, but still practical for e.g. applying a scanning based local dimming.

The implementation of a speckle reduction can be realized within a projection display device in order to avoid the use of a display size moved scatter foil, which is e.g. used within television display devices. It can be advantageous to implement spectral $\gamma_{12}$ and mutual $|\mu_{12}|$ coherence reduction for each light beam or secondary light source, which may be lateral extended light sources with e.g. a circular shape and preferable no point light sources. Incoherent wave field segments are imaged onto an exit plane of the backlight unit illuminating the image SLM.

Optical fiber arrays realizing different optical path lengths can be provided to reduce the temporal coherence of a single light source, of a plurality of light sources or of light source array used. In another procedure two transmissive or reflective stair-type optical elements can be used, which are crossed and arranged within a telescope or a 4-f arrangement.

A compensation of different optical path lengths, e.g. by using tailored array-type optics, can be used. Such tailored array-type optics, which might also be formed by using an array of optical elements, can be realized as active components. The active components are synchronized with the scanning in order to provide optimal compensation of different optical path lengths. For example, an array of laser diodes, e.g. vertical-cavity surface emitting laser (VCSEL), as light sources can be provided with an array of micro lenses. The array of micro lenses provides individual modification of the collimation in order to compensate for different optical path lengths to the SLM to be illuminated. This means that each laser diode of the array comprises an optimized corrective element. The corrective element might be realized as phase element only or as a complex-valued optical element. This means that phase correction and an optimized apodization profile can be used. The correction can be optimized for the center of the individual scanning area, which is addressed by the single light beam or wave field segment and which is placed within an entrance plane of the SLM to be illuminated by using local dimming. In addition to a fixed correction, a dynamic correction can be implemented, too. For example, deformable mirror elements can be provided. It is also an option to use micro lenses, which are moved along their optical axis by using e.g. a voice coil-like arrangement. A dynamic element can be formed as an array of optical elements or as a single element. An array of correction elements can be dynamically addressed as a single array-type element. Or, the individual elements of the array can be dynamically addressed individually. One boundary condition is the reasonable fast wave front forming, which has to follow the scanning process. However, the more wave field segments are used, the slower is the modulation required for the individual wave field segments. It is also possible to use a set of crossed liquid crystal based active-type gratings or active-type polarization gratings for the correction of local optical path length related aberrations, which might be required during the scanning operation.

A further boundary condition of local dimming used within holographic display devices is the avoidance of the partial illumination of sub-holograms at a numerical aperture that is smaller than the numerical aperture of the eye of the observer, thus reducing the spatial resolution of the three-dimensional object shown. Therefore, local dimming of holographic display devices is implemented preferably as frame-wise operation. An image of a first intensity distribution onto an exit plane of the illumination device of the display device, which can be the entrance plane of the SLM to be illuminated, can provide this frame-type local dimming.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings

The invention claimed is:

1. An apparatus for generating two-dimensional and/or three-dimensional objects that include object points, the apparatus comprising:
   at least one spatial light modulator device for modulating incident light,
   an optical system, which is designed and arranged such that a segmentation of wave fields is provided in a plane, where the plane in which the segmentation of the wave fields is provided differs from a plane that comprises the object points of the object, where adjacent segmented wave fields do have a mutual overlap.

2. The apparatus according to claim 1, wherein at least one light guiding element is provided, the at least one light guiding element is combined with the optical system.

3. The apparatus according to claim 2, wherein the optical system is arranged within the at least one light guiding element in such a way that a defined decoupling of wave fields is provided or the optical system is provided at least at one surface of the light guiding element.

4. The apparatus according to claim 1, wherein the at least one spatial light modulator device is a self-illuminating spatial light modulator device.

5. The apparatus according to claim 1, wherein an illumination device is provided having at least one light source.

6. The apparatus according to claim 1, wherein the segmentation of the wave fields is provided in the illumination beam path and/or imaging beam path, by which wave field segments are generated, where adjacent wave field segments form overlapping zones between the wave field segments.

7. The apparatus according to claim 1, wherein the illumination device comprises at least two individual light sources emitting wave fields in order to generate wave field segments.

8. The apparatus according to claim 7, wherein each individual light source of the illumination device is provided to generate a corresponding wave field segment.

9. The apparatus according to claim 1, wherein the wave fields of the overlapping wave field segments are mutually incoherent to each other.

10. The apparatus according to claim 1, wherein the wave fields are complex-valued wave fields, where the intensity distribution of the complex-valued wave fields is adapted such that the total intensity distribution generated by the overlapping wave field segments is a homogeneous intensity distribution.

11. The apparatus according to claim 1, wherein the optical system comprises at least one grating or reflective layer for the segmentation of the wave fields.

12. The apparatus according to claim 11, wherein the grating is designed as a one-dimensional grating or as a grating being substantially rectangular shaped along two directions or substantially hexagonal along two directions.

13. The apparatus according claim 1, wherein the individual wave field segments used to illuminate the at least one spatial light modulator device is controlled individually in the amplitude present within a time frame.

14. The apparatus according to claim 1, wherein the overlap of the wave field segments is generated within an area of the spatial light modulator device to be illuminated or within the entire area imaged by the spatial light modulator device at least within a defined time frame.

15. The apparatus according to claim 14, wherein the overlap of the wave field segments generated to illuminate an entire area of the spatial light modulator device or to image an entire area of the spatial light modulator device at least within a defined time frame, which is equivalent to a part of an image frame At, is carried out in a temporal scanning procedure.

16. The apparatus according to claim 5, wherein the at least two light sources are designed as lasers or laser diodes or light emitting diodes which are combined with each other.

17. The apparatus according to claim 16, wherein at least two light sources, preferably designed as laser diodes, are combined with each other, where at least one Bragg resonator mirror element or diffractive wavelength stabilizing configurations assigned to the at least two light sources provides a single spectral output wavelength for the at least two light sources, the spectral output wavelength does not exceed a limit of $\Delta\lambda_0 < 0.1$ nm as mutual difference value (of the laser line emitted).

18. The apparatus according to claim 16, wherein at least two light sources, preferably designed as laser diodes, are combined with each other, where at least one Bragg resonator mirror element assigned to the at least two light sources provides a single spectral output wavelength for the at least two light sources, the spectral output wavelength does not exceed a limit of $\Delta\lambda < 0.1$ nm of the spectral line width of the light emitted.

19. The apparatus according to claim 1, wherein a scanning unit is provided for carrying out spatio-temporal scanning of wave field segments.

20. The apparatus according to claim 1, wherein a beam shaping element is provided for transforming incident wave fields provided by individually controlled light sources into defined complex-valued wave field segments.

21. The apparatus according to claim 20, wherein the beam shaping element transforming incident wave fields is designed as a rotating scatter plate or rotating scatter foil or a dynamic beam shaping diffuser.

22. The apparatus according to claim 1, wherein a high dynamic range imaging and/or a high luminance imaging is provided.

23. The apparatus according to claim 1, wherein an intensity distribution is generated that has a maximum value in the center of a wave field segment and a value of zero at a rim of the wave field segment, where the intensity distribution is continuous from the center to rim of the wave field segment.

24. The apparatus according to claim 1, wherein a phase distribution within a wave field segment is a constant phase distribution or a continuous phase distribution.

25. The apparatus according to claim 1, wherein the light intensity distribution required for a partial illumination of the spatial light modulator device is generated by active phase gratings or active polarization gratings.

26. The apparatus according to claim 1, wherein a spectral conversion layer is provided at an entrance plane of the spatial light modulator device.

27. The apparatus according to claim 26, wherein quantum dots are used as material for the spectral conversion layer.

28. The apparatus according to claim 26, wherein a combination of the spectral conversion layer and a structured color filter array for the primary light colors, or a triple notch filter for the primary light colors is provided for carrying out the spectral conversion.

29. The apparatus according to claim 1, wherein a grating and a micro lens array are provided for generating a spatial separation of different spectral components.

30. A method for generating segmented wave fields in a display device, comprising:

generating at least two wave fields in front or behind at least one spatial light modulator device, seen in the direction of propagation of light, segmenting the at least two wave fields by an optical system in a plane that differs from a plane that comprises generated object points of an object to be displayed, and generating an overlap with adjacent segmented wave fields.

31. The method according to claim 30, wherein in case of using coherent light sources spectral conversion is carried out for providing mutual incoherence of the wave field segments.

\* \* \* \* \*